(12) United States Patent
Sarmenta

(10) Patent No.: US 8,764,571 B2
(45) Date of Patent: Jul. 1, 2014

(54) METHODS, APPARATUSES AND COMPUTER PROGRAM PRODUCTS FOR USING NEAR FIELD COMMUNICATION TO IMPLEMENT GAMES AND APPLICATIONS ON DEVICES

(75) Inventor: Luis Francisco Sarmenta, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 70 days.

(21) Appl. No.: 13/211,864

(22) Filed: Aug. 17, 2011

(65) Prior Publication Data

US 2012/0077593 A1    Mar. 29, 2012

Related U.S. Application Data

(63) Continuation-in-part of application No. 12/889,956, filed on Sep. 24, 2010.

(51) Int. Cl.
*A63F 9/24*    (2006.01)
*G06F 3/048*    (2013.01)

(52) U.S. Cl.
USPC ............................................ 463/43; 715/757

(58) Field of Classification Search
USPC ....... 273/237; 345/156; 370/429; 463/22, 30, 463/40–43
See application file for complete search history.

(56) References Cited

U.S. PATENT DOCUMENTS

| | | | |
|---|---|---|---|
| 6,674,426 B1 * | 1/2004 | McGee et al. | ................ 345/173 |
| 7,883,420 B2 | 2/2011 | Bradbury et al. | |
| 8,077,157 B2 | 12/2011 | Sengupta et al. | |
| 2003/0134679 A1 * | 7/2003 | Siegel et al. | ..................... 463/43 |
| 2006/0197669 A1 * | 9/2006 | Wu et al. | ..................... 340/572.7 |
| 2007/0047568 A1 * | 3/2007 | Wang et al. | ................... 370/429 |
| 2007/0097832 A1 | 5/2007 | Koivisto et al. | |
| 2007/0239981 A1 | 10/2007 | Lessing | |

(Continued)

FOREIGN PATENT DOCUMENTS

| | | |
|---|---|---|
| DE | 202010006477 | 8/2010 |
| EP | 2098271 | 9/2009 |
| WO | WO 2010/015995 | 2/2010 |

OTHER PUBLICATIONS

Broll, et al., Touch to Play—Mobile Gaming with Dynamic, NFC-based Physical User Interfaces, *Presented at Mobile HCI, '10*, Sep. 7-10, 2010, Lisbon, Portugal, 3 pages.

(Continued)

*Primary Examiner* — Dmitry Suhol
*Assistant Examiner* — Jason Yen
(74) *Attorney, Agent, or Firm* — Alston & Bird LLP

(57) ABSTRACT

A game kit of components for playing an electronic game or application and an apparatus and method of using the components of the game kit is provided. The game kit may include a plurality of near field communication game pieces including one or more items of data. At least one of the near field communication game pieces is configured to enable transmission of the items of data, via a near field communication, to a device to enable the device to decode the data and translate at least one item of the data to at least one item of virtual data that is included in an electronic game or an application currently being displayed. The near field communication may direct the transmission of the data to the device in response to a detection of the device entering a proximity of the game piece.

25 Claims, 15 Drawing Sheets

Facilitate assignment of one or more items of data based in part on one or more properties of an apparatus to enable utilization of the apparatus with a plurality of different games or different applications based at least in part on non-application specific content of the data — 1500

Enable transmission of the items of data of the apparatus, via a near field communication, to a device to enable the device to decode the data and translate at least one item of the data to at least one item of virtual data that is included in the electronic game or the application currently being displayed — 1505

(56) References Cited

U.S. PATENT DOCUMENTS

| | | | |
|---|---|---|---|
| 2008/0039212 | A1 | 2/2008 | Ahlgren et al. |
| 2008/0108391 | A1 | 5/2008 | Vau et al. |
| 2008/0109309 | A1* | 5/2008 | Landau et al. ............... 705/14 |
| 2009/0111378 | A1 | 4/2009 | Sheynman et al. |
| 2009/0150802 | A1* | 6/2009 | Do et al. ............... 715/757 |
| 2009/0276439 | A1 | 11/2009 | Rosenblatt et al. |
| 2010/0013762 | A1* | 1/2010 | Zontrop et al. ............ 345/156 |
| 2010/0032900 | A1* | 2/2010 | Wilm ............... 273/237 |
| 2010/0261519 | A1* | 10/2010 | Zapata et al. ............... 463/22 |
| 2010/0331083 | A1* | 12/2010 | Maharbiz et al. ............ 463/30 |
| 2011/0161365 | A1 | 6/2011 | Shin et al. |
| 2011/0244964 | A1* | 10/2011 | Glynne-Jones et al. ....... 463/40 |
| 2011/0300941 | A1* | 12/2011 | Weston et al. ............... 463/37 |
| 2012/0084181 | A1 | 4/2012 | Miura et al. |

OTHER PUBLICATIONS

RFID Sensor for Lego® Mindstorms®, copyright 2007, downloaded as early as Aug. 17, 2011 from http://www.codatex.com/index.php?en_RF_ID_Sensor-1.

International Searching Authority, International Search Report and Written Opinion for International Application No. PCT/IB2011/053336, mailed Feb. 9, 2012, 12 pages, Swedish Patent and Registration Office, Sweden.

United States Patent and Trademark Office, Office Action for U.S. Appl. No. 12/889,956, mailed Jan. 30, 2012, 13 pages, USPTO, USA.

Seewoonauth, et al. "Two NFC Interaction Techniques for Quickly Exchanging Pictures Between Mobile Phone and a Computer," *Mobile HCI* '09, Sep. 15-18, 2009, Bonn, Germany.

Akrbopoulos, et al., Developing Multiplayer Pervasive Games and Networked Interactive Installations Using Ad Hoc Mobile Sensor Nets, *Research Academic Computer Technology Institute*, Oct. 29-31, 2009, Athens, Greece.

"Near Field Communication—White Paper," ECMA International, 2005.

Kessler, "NFC Technology: 6 Ways It Could Change Our Daily Lives," *Mashable Tech*, May 6, 2010, http://mashable.com/2010/05/06/Near-Field-Communication/.

Office Action Dated Jan. 30, 2012, for U.S. Appl. No. 12/889,956, filed Sep. 24, 2010.

Park, et al. "Trading Card Game Exploiting RFID and 3D Graphics," 2010 3rd International Conference on Human-Centric Computing, Aug. 2010, 5 pages.

International Search Report and Written Opinion of International Searching Authority dated Feb. 9, 2012 for corresponding application No. PCT/IB2011/053336.

The Near Field Communication Forum, "NFC Forum Technical Specifications, NFC Data Exchange Format (NDEF) Technical Specification, NFC Forum Tag Type Technical Specifications," May 22, 2009 to Jan. 15, 2013, Internet Archive <http://web.archive.org/web/20090522211834/http://www.nfc-forum.org/specs/spec_list> 3 pages.

United States Patent and Trademark Office, Office Action for U.S. Appl. No. 12/889,956, dated Jan. 24, 2013, 14 pages, USA.

Coppens, Toon, "NFC—RFID Urban Game Using The Touchtag Contactless Service," Aug. 31, 2009, <http://www.slideshare.net/touchtag/nfc-rfid-urban-game-using-the-touchtag-contactless-service>.

United States Patent and Trademark Office, Office Action for U.S. Appl. No. 12/889,956, dated Jun. 28, 2013, 11 pages, USA.

Streitz et al., Roomware: Towards the next generation of human-computer interaction based on an integrated design of real and virtual worlds; GMD—German National Research Center for Information Technology; IPSI—Integrated Publication and Information Systems Institute, Darmstadt, Germany, 23 pages.

* cited by examiner

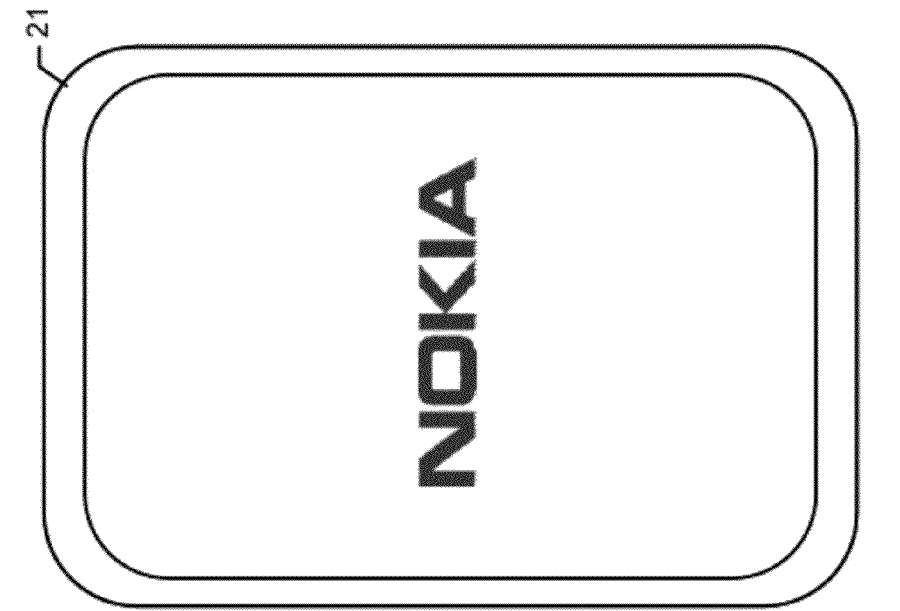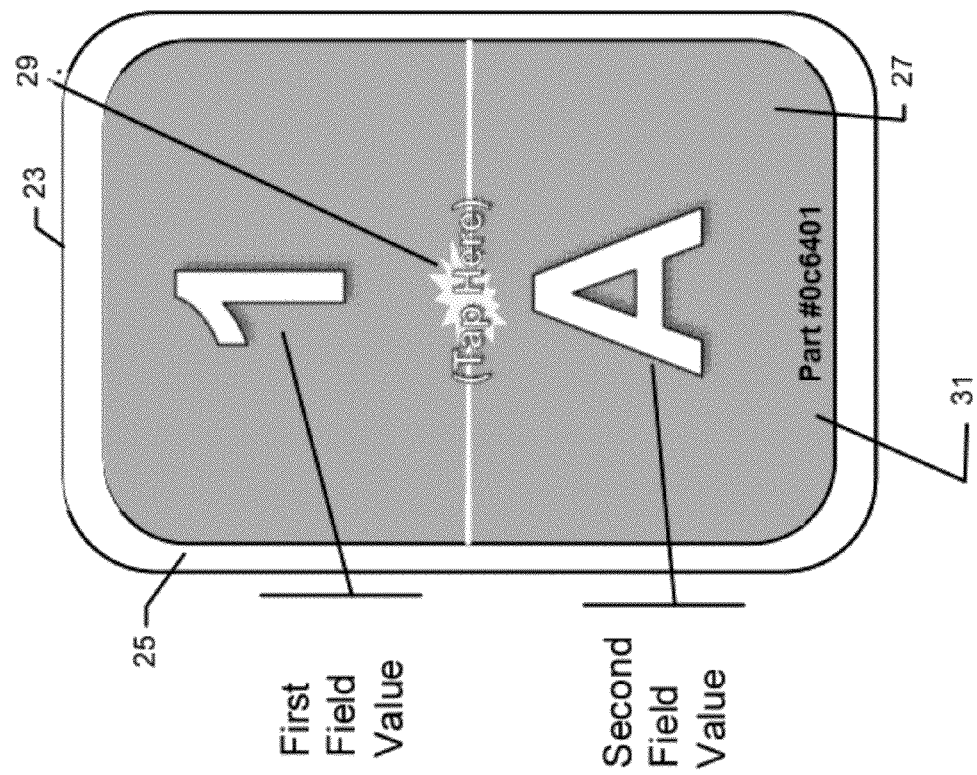
FIG. 9.

METHODS, APPARATUSES AND COMPUTER PROGRAM PRODUCTS FOR USING NEAR FIELD COMMUNICATION TO IMPLEMENT GAMES AND APPLICATIONS ON DEVICES

CROSS-REFERENCE TO RELATED APPLICATIONS

This application is a continuation-in-part of copending U.S. patent application Ser. No. 12/889,956, filed on Sep. 24, 2010, which is hereby incorporated herein in its entirety by reference.

TECHNOLOGICAL FIELD

An example embodiment of the invention relates generally to mobile terminal technology and, more particularly, relate to a method, apparatus, and computer program product for using Near Field Communication (NFC) technologies to implement electronic games and applications.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, games, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, electronic games may enhance the interaction that users have with their mobile phones. As such, users of mobile phones often spend a great deal of time playing electronic games. However, the users may become very familiar with a particular game, such that the user can anticipate the action of the game before an event occurs in the game. Such familiarity may cause the user to become bored with a game. One method of preventing such boredom is to frequently acquire new games to play. Currently, new games involving virtual worlds have become popular. At present, some of these games involve sitting at a computer and typing or using a mouse. As mobile phones become more ubiquitous, it may be beneficial to take advantage of the mobile nature of these phones to deliver a game or application experience that is more intuitive, fun, physical, tangible, and interactive.

In this regard, mobile phones implementing Near Field Communication may provide a particularly new and promising opportunity relating to electronic gaming that at present may not be fully exploited. Near Field Communication enables data to be exchanged between devices over a short range (e.g., 10 centimeters). As such, it may be beneficial to allow data to be received via NFC to be implemented in an electronic game by a mobile phone. In this manner, a user's interest in the game may be enhanced since NFC data may be brought into the electronic game. Currently, there are many games that involve virtual worlds, but these games typically do not use NFC. The most common electronic games involve displaying a virtual world on a screen and allowing a user to interact with objects in the virtual world using a keyboard, mouse, or other game pointer. However, these games typically do not use NFC on a mobile device.

Additionally, while there are a number of existing techniques that use NFC on mobile phones and devices, these techniques typically do not implement NFC in an electronic game. For instance, currently a mobile phone may be utilized to read an NFC tag that contains an identifier of a media file and the phone may play the media file to the user. For example, a movie poster may have an NFC tag and when the user brings the phone in the proximity of the NFC tag, the NFC tag may provide the phone with a movie trailer that may be played and shown on the display of the phone. As another example, artwork in a museum may have an associated tag and when the user brings the phone in the proximity of the tag, a multimedia tour guide may be provided to the user's phone that explains facts about the artwork. Instead of a media file, the mobile phone may receive arbitrary information about an object that a NFC tag is attached to. For instance, a user of a phone may bring the phone in the proximity of a bus stop having an NFC tag with the location of the bus stop and read the NFC tag to obtain the time that next bus is scheduled to arrive. Even though the foregoing examples illustrate that there are mechanisms for using NFC on mobile phones these mechanisms do not typically utilize NFC in an electronic game of a mobile phone or mobile device.

It may be desirable to provide an alternative mechanism by which to implement electronic games and applications on communication devices. In this regard, it may be advantageous to create interesting electronic games involving virtual worlds by utilizing NFC and creating games that may be played even when there may be constraints on the data that NFC tags may contain. Additionally, it may be beneficial to create a game that allows users to easily play a variety of different games without requiring the users to buy new hardware.

BRIEF SUMMARY

A method, apparatus and computer program product are therefore provided for enabling a multitude of games, educational applications, and other interactive applications by utilizing Near Field Communication on a communication device.

In this regard, an example embodiment may facilitate creation of interesting electronic games and applications involving virtual worlds by utilizing NFC and creating games and applications that may be played even when there may be constraints (e.g., ability to write data to an NFC tag) on the data that NFC tags may contain. Additionally, an example embodiment may facilitate creation of a game kit that enables non-expert players to easily play a number of various different games without requiring the players to buy new hardware or NFC cards. An example embodiment may utilize techniques to allow different games and applications to be implemented without writing game specific data onto each NFC tag. This may enable an electronic game or application to be played using a set of existing NFC tags (e.g., NFC enabled credit cards, product tags, poster tags, etc.) that may not initially be made for the game or application.

Moreover, an example embodiment may enable a communication device to utilize NFC to give a user the feeling of being able to look into a virtual world of an electronic game or application by tapping or holding the communication device within a proximity of one or more NFC tags. It should be pointed out that the NFC tags of an example embodiment may not have any visible markings to denote a source from which data may be read from the NFC tags. This is slightly different than reading data from a barcode since the source of the reading (e.g., the barcode) may be visible to a user.

In one example embodiment, a game kit of components for playing one or more electronic games or applications is provided. The game kit may include a plurality of near field communication game pieces including one or more items of data. At least one of the near field communication game pieces may be configured to enable transmission of the items of data, via a near field communication, to a device to enable the device to decode the data and translate at least one item of the data to at least one item of virtual data that is included in an electronic game or an application currently being displayed. The near field communication may include directing the transmission of the data to the device in response to a detection of the device entering a proximity of the at least one game piece.

In another example embodiment, a method of using the components of a game kit is provided. The method may include enabling transmission of one or more items of data of at least one near field communication game piece, via a near field communication, to a device to enable the device to decode the data and translate at least one item of the data to at least one item of virtual data that is included in an electronic game or an application currently being displayed. The near field communication may include directing the transmission of the data to the device in response to a detection of the device entering a proximity of at least one game piece.

In another example embodiment, an apparatus of using the components of a game kit is provided. The apparatus may include a processor and memory including computer program code. The memory and the computer program code are configured to, with the processor, cause the apparatus to at least perform operations including enabling transmission of one or more items of data of the apparatus, via a near field communication, to a device to enable the device to decode the data and translate at least one item of the data to at least one item of virtual data that is included in an electronic game or an application currently being displayed. The near field communication may include directing the transmission of the data to the device in response to a detection of the device entering a proximity of the apparatus.

An embodiment of the invention may provide a better user experience by utilizing NFC to quickly, easily and reliably customize electronic games and interactive applications which may enhance the user's interest in the electronic games and applications. As a result, device users may enjoy improved capabilities with respect to electronic games and applications accessible via the device.

BRIEF DESCRIPTION OF THE SEVERAL VIEWS OF THE DRAWINGS

Figure 1:
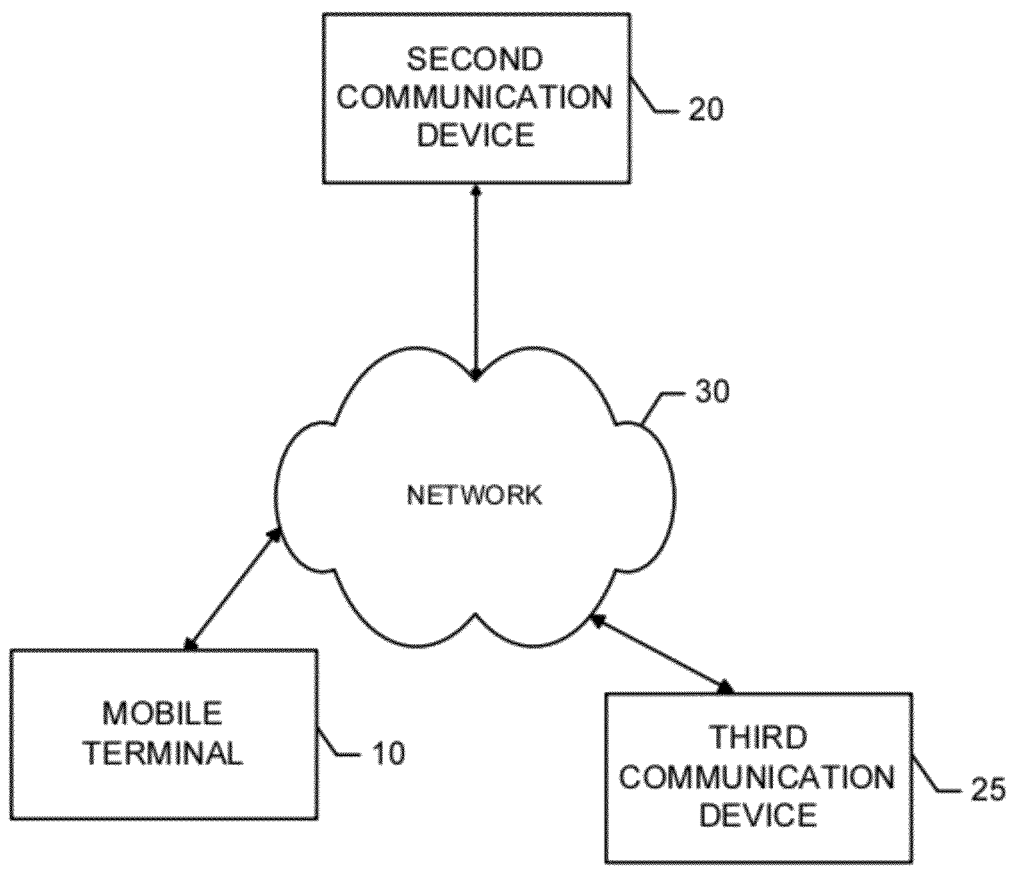
Figure 2:
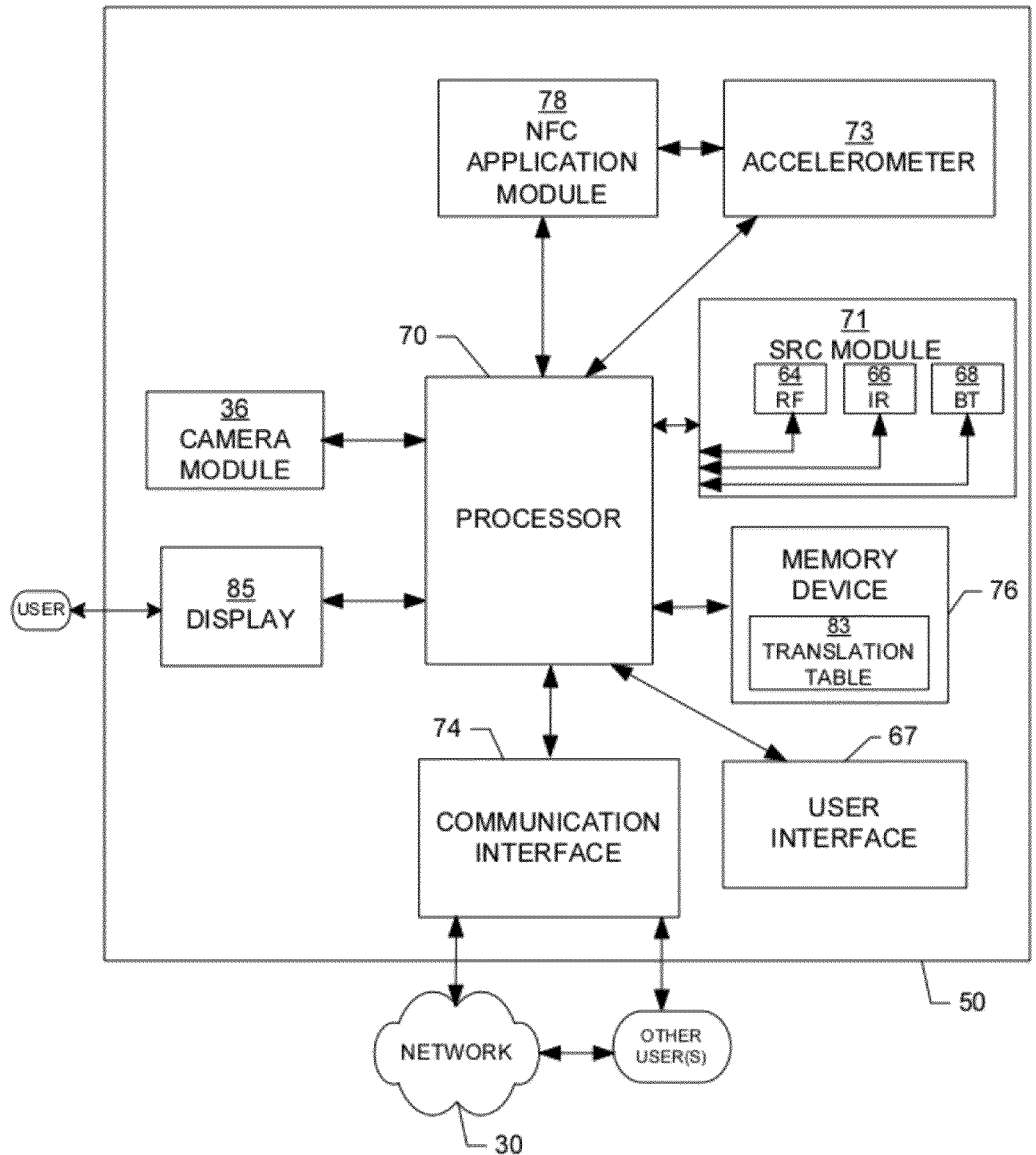
Figure 3:
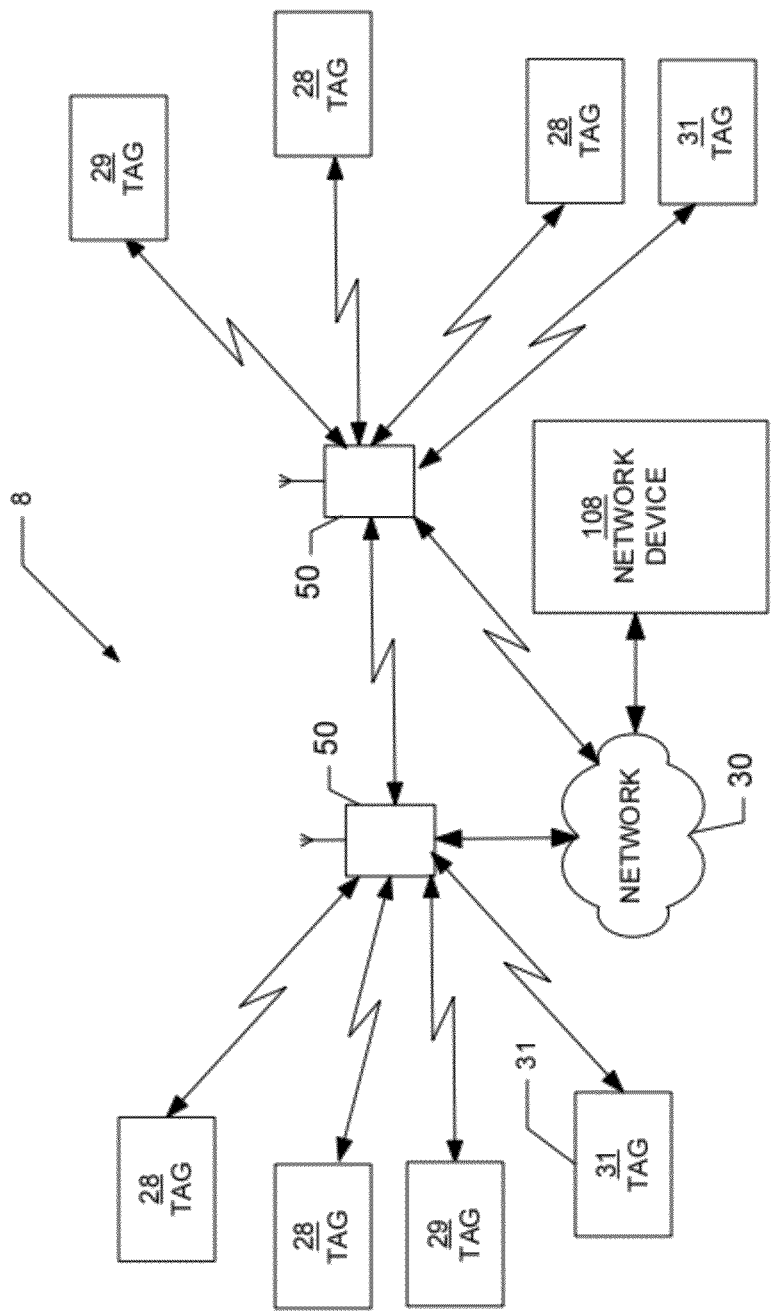
Figure 4:
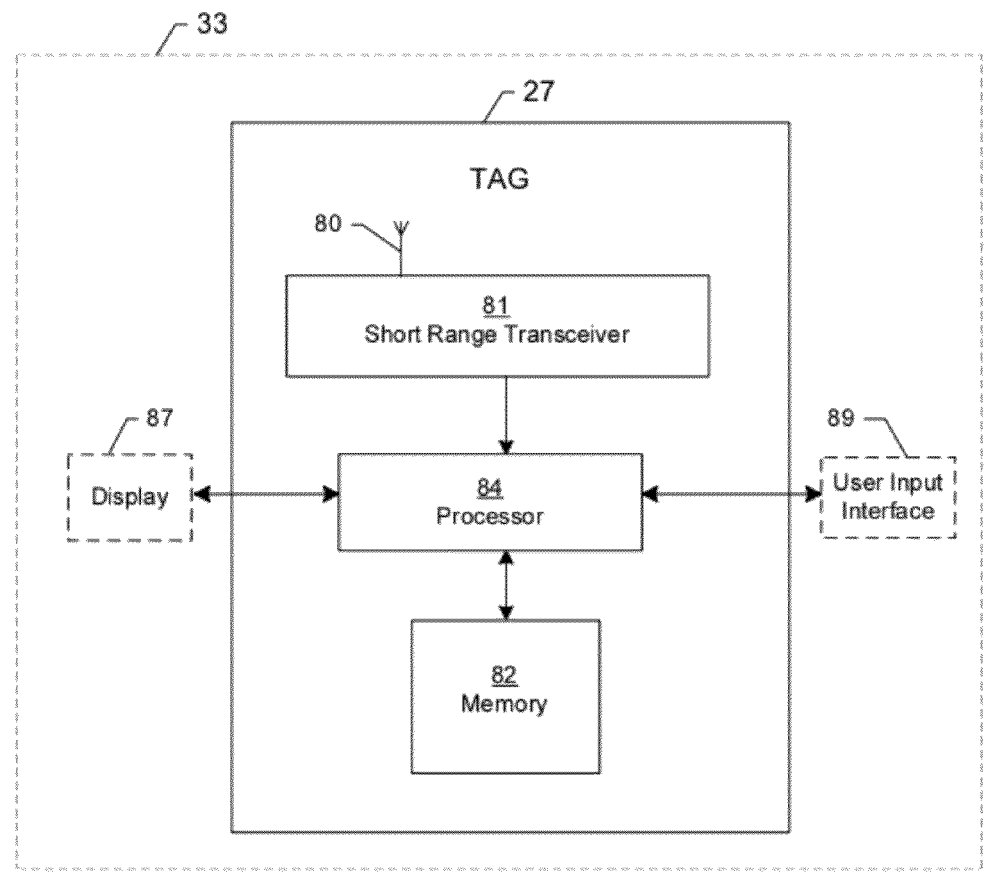
Figure 5:
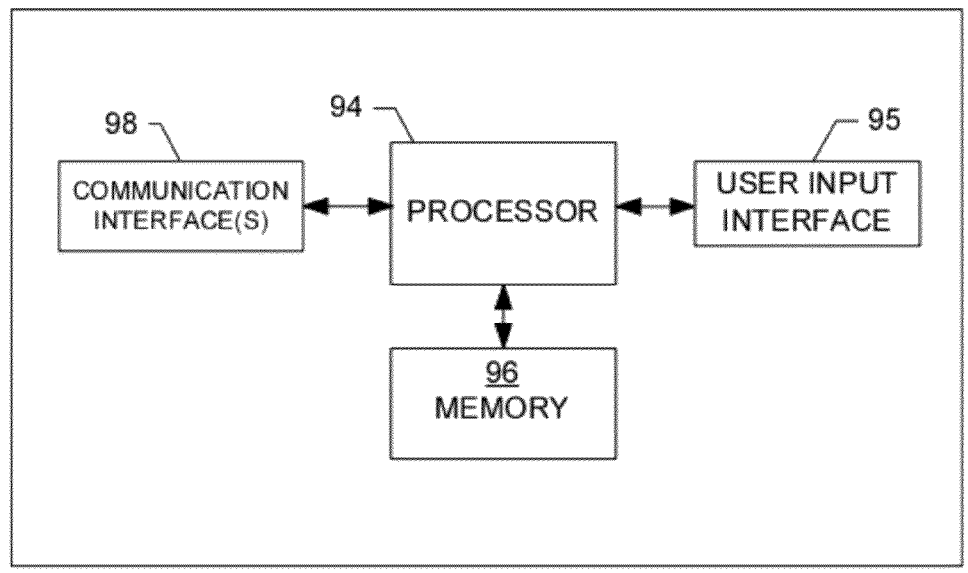
Figure 6:
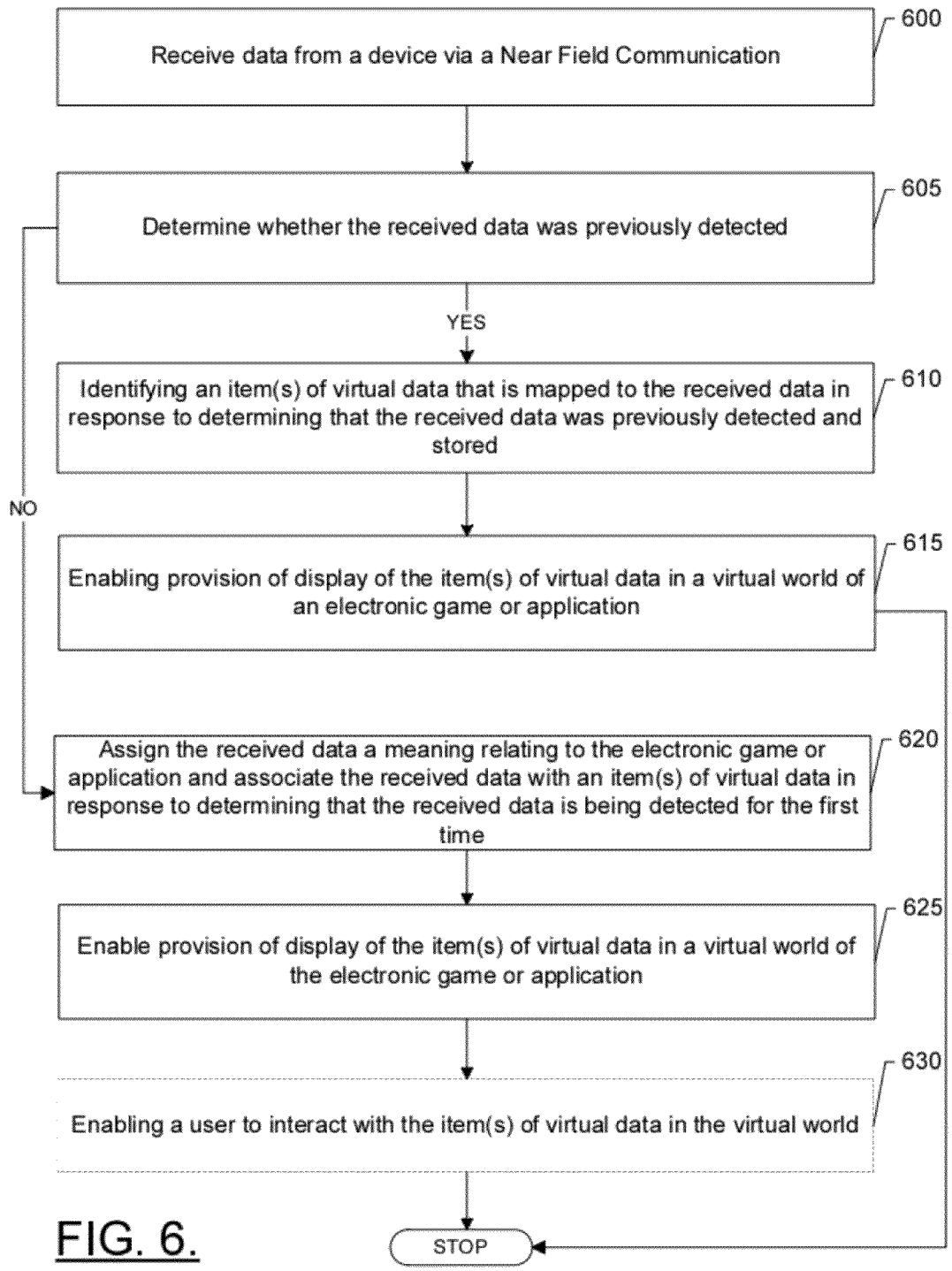
Figure 7:
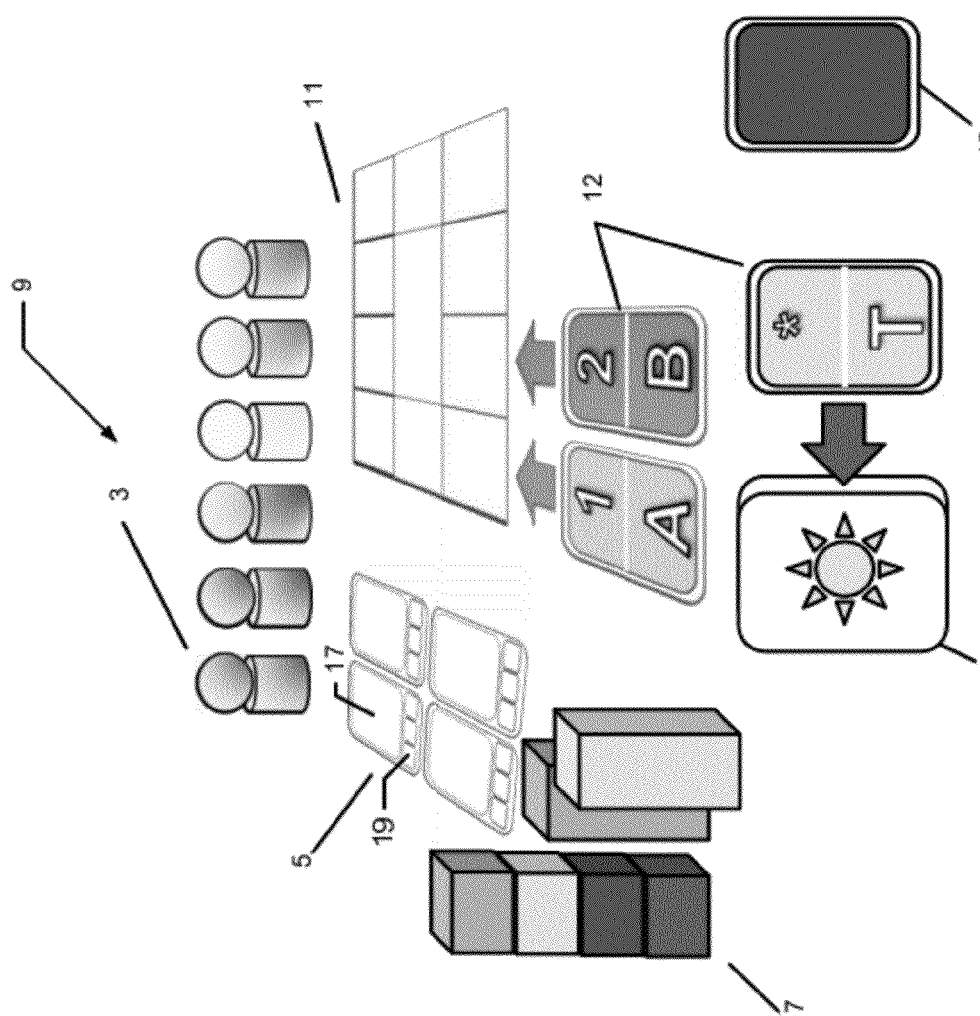
Figure 8:
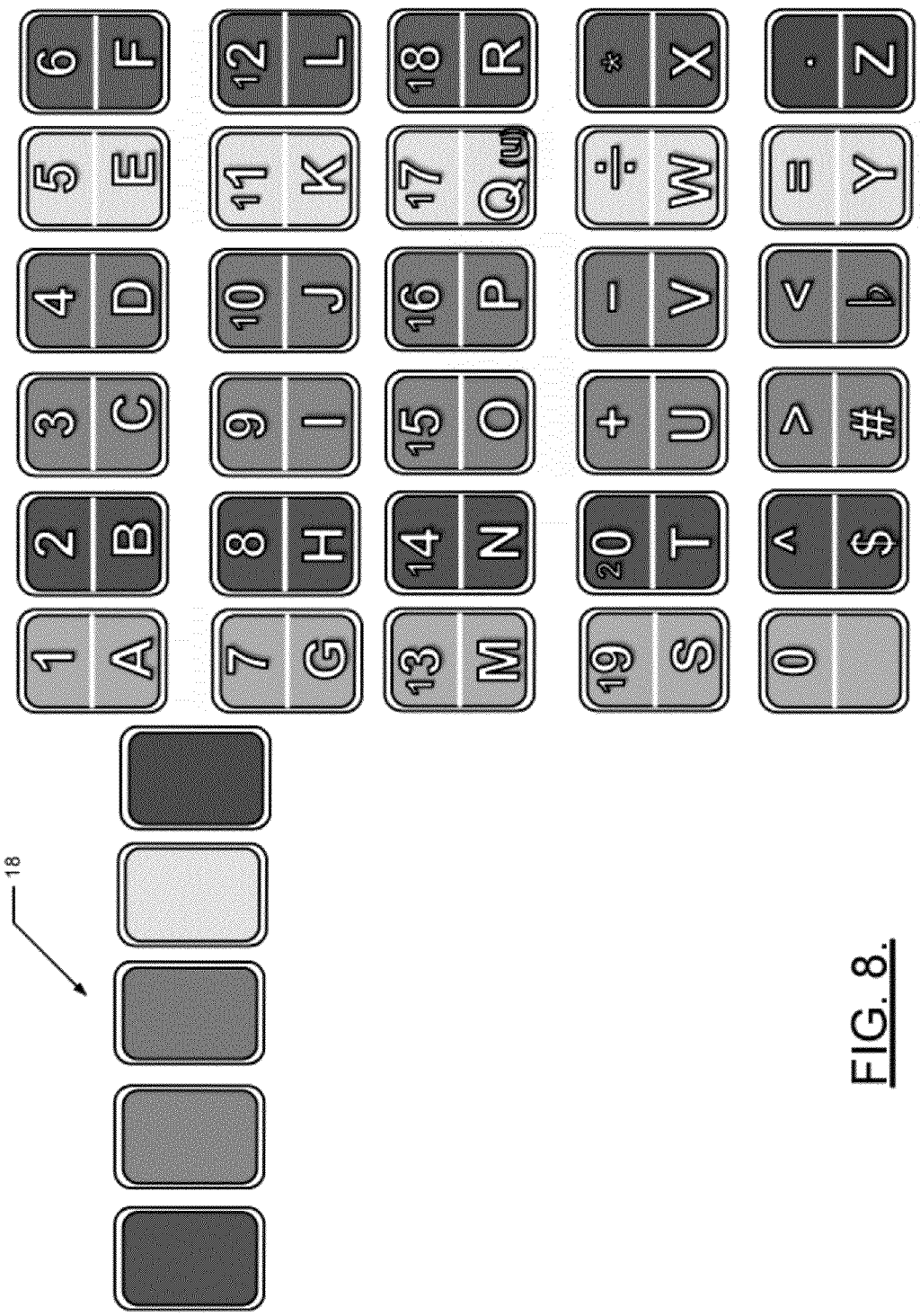
Figure 10:
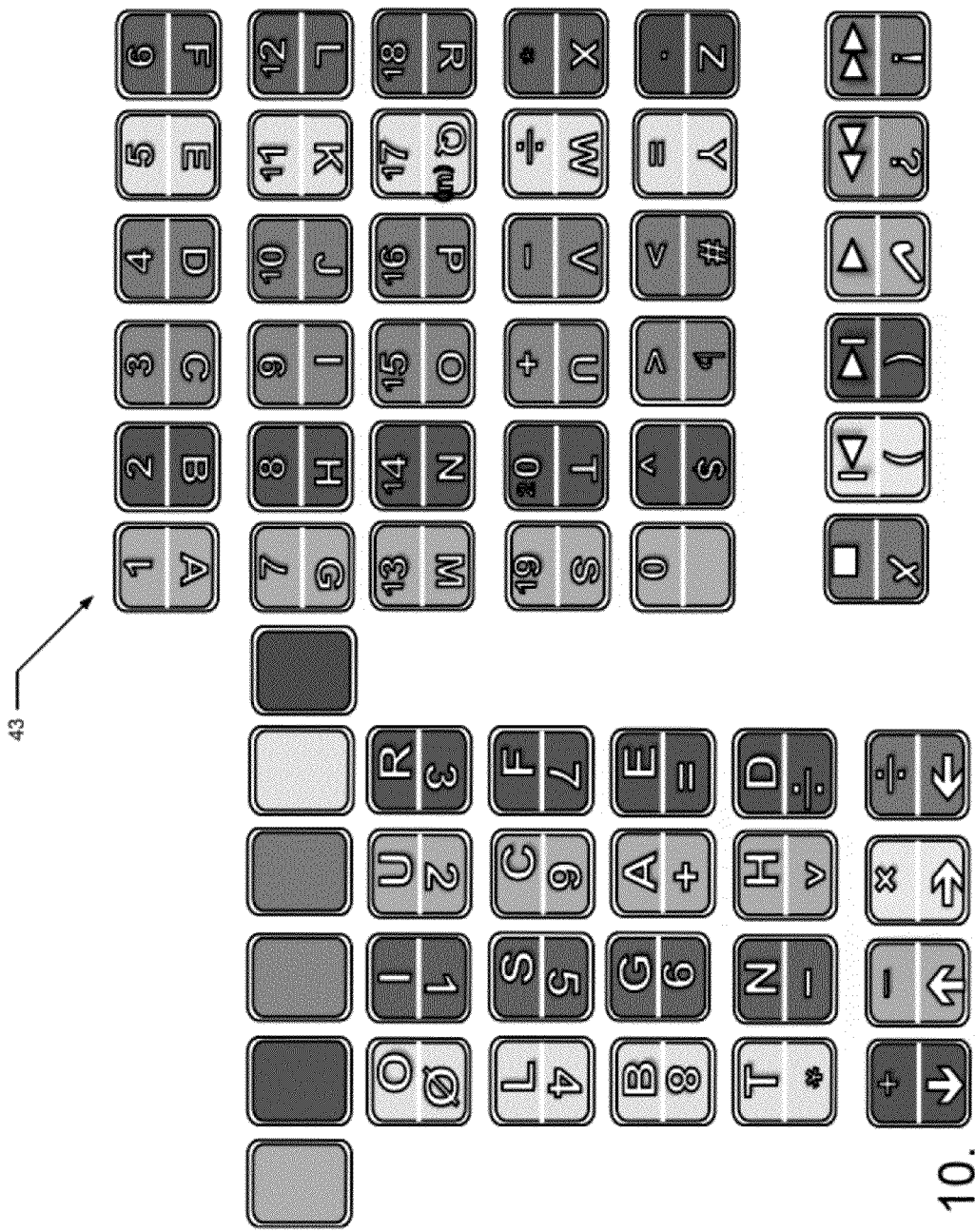
Figure 11:
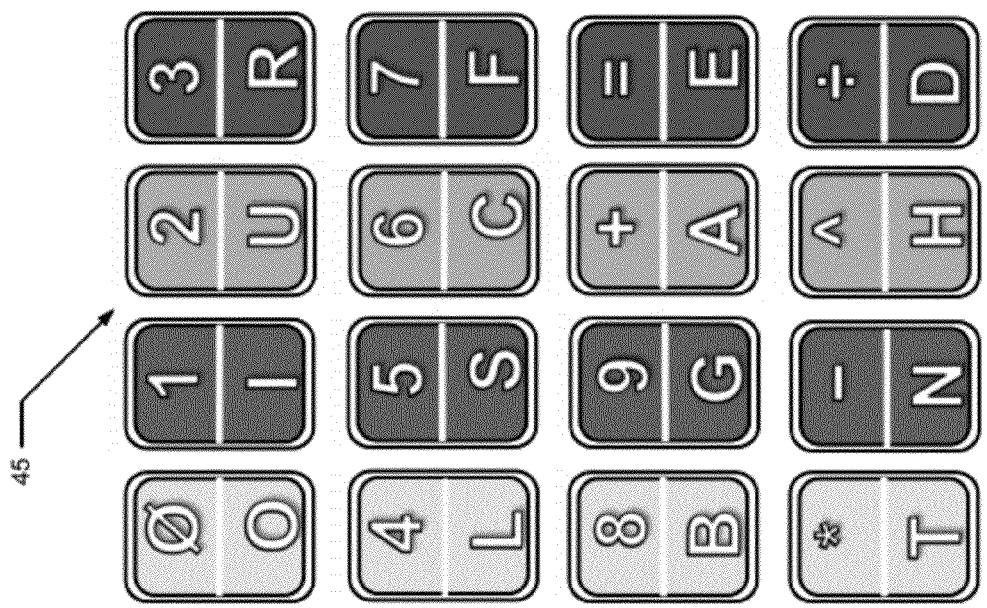
Figure 12:
Figure 13:
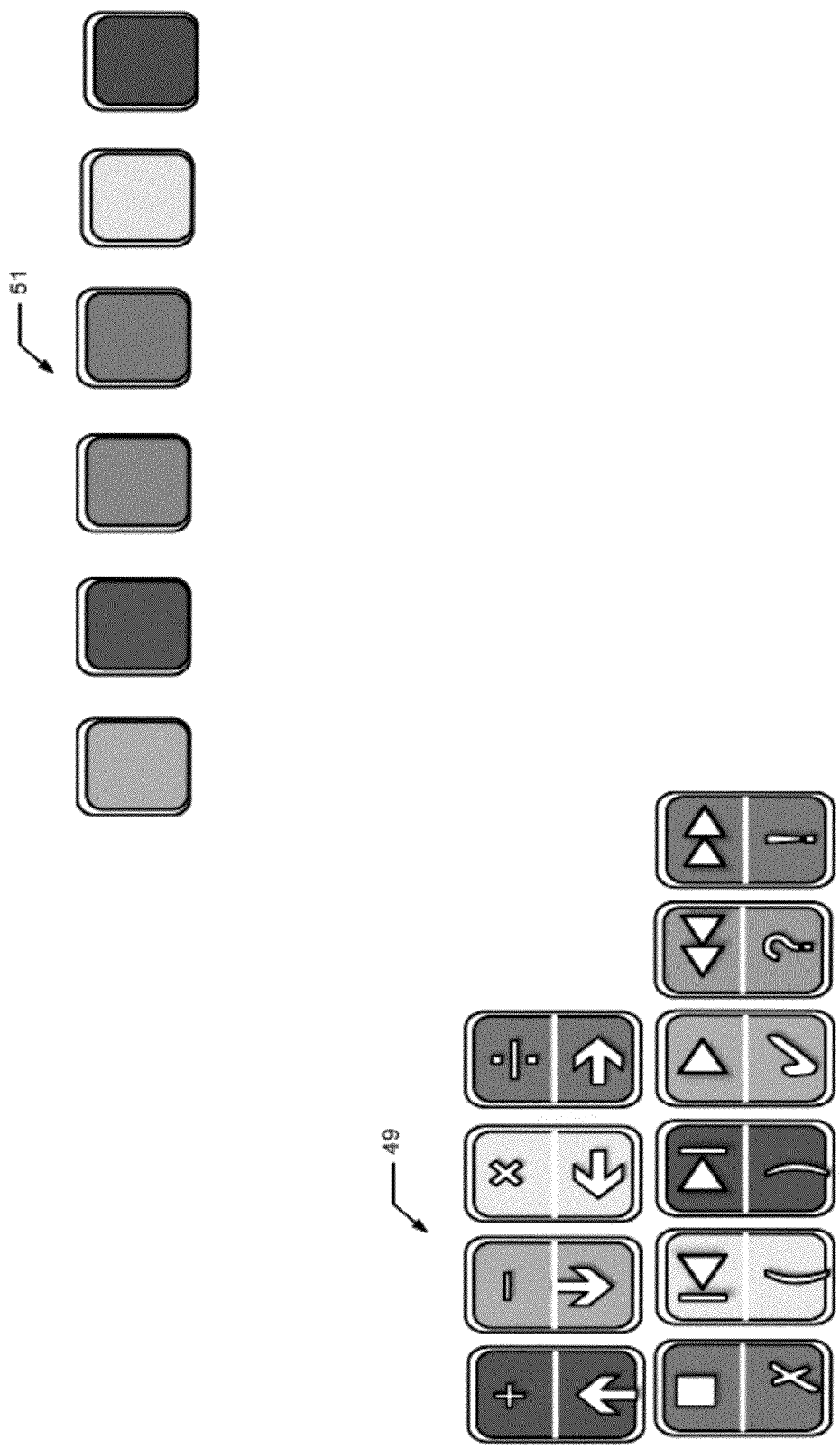
Figure 14:
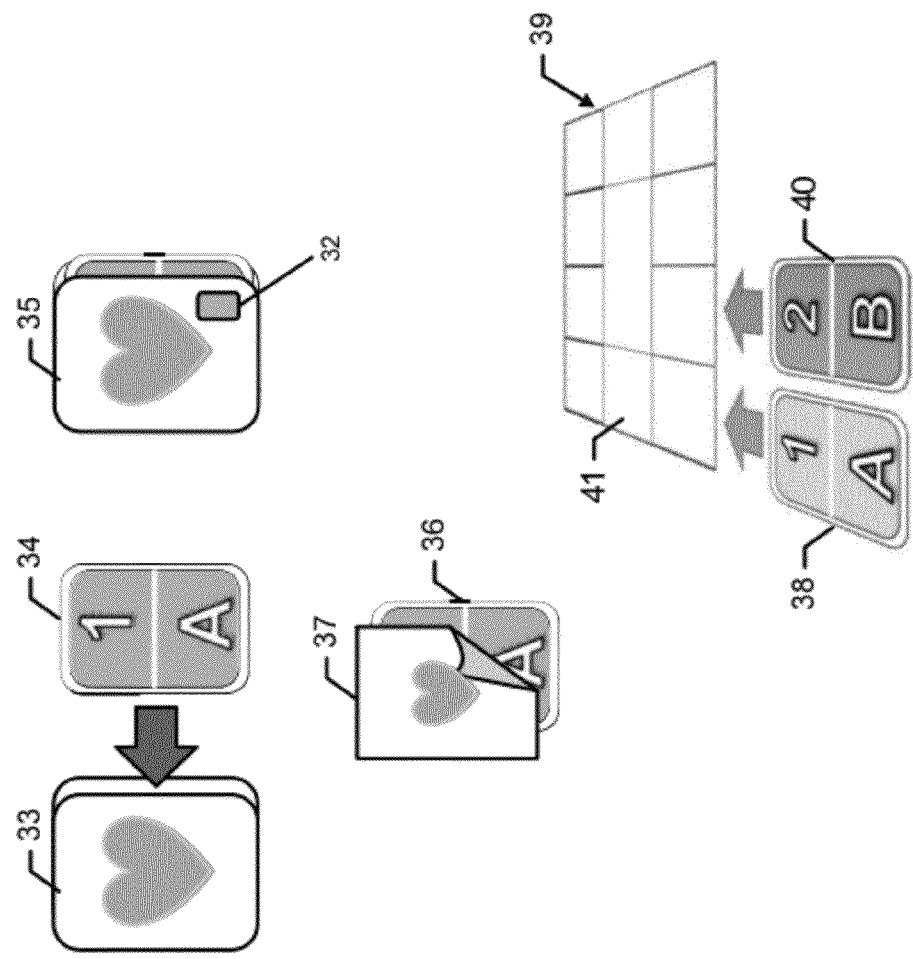
Figure 15:
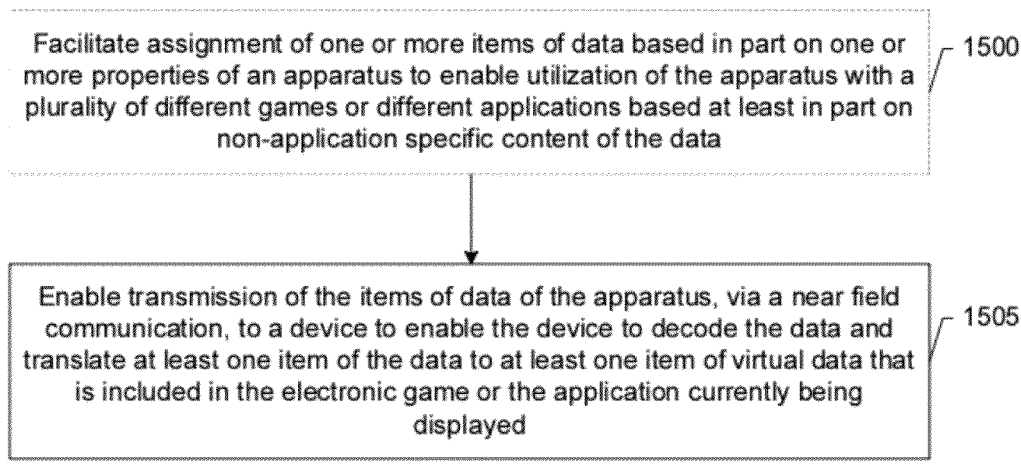

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus for utilizing NFC to implement one or more electronic games or applications according to an example embodiment of the invention;

FIG. 3 is an example embodiment of a system according to the invention;

FIG. 4 is a schematic block diagram of a NFC tag according to an example embodiment of the invention;

FIG. 5 is a schematic block diagram of a network device according to an example embodiment of the invention;

FIG. 6 illustrates a flowchart for utilizing NFC to implement an electronic game or application according to an example embodiment of the invention;

FIG. 7 is a diagram of a system including a game kit of components according to an example embodiment of the invention;

FIG. 8 is a diagram of a starter deck of cards according to an example embodiment of the invention;

FIG. 9 is a diagram of a NFC game card according to an example embodiment of the invention;

FIG. 10 is a diagram of an upside-down version a deck of NFC game cards according to an example embodiment of the invention;

FIG. 11 is a diagram of a mini deck of NFC game cards according to an example embodiment of the invention;

FIG. 12 is a diagram of an expansion set of NFC game cards according to an example embodiment of the invention;

FIG. 13 is a diagram of an optional set of NFC game cards and NFC stickers according to an example embodiment of the invention;

FIG. 14 is a diagram of one or more accessories that may be utilized with or added to a game kit according to an example embodiment of the invention; and FIG. 15 illustrates a flowchart for utilizing NFC to implement an electronic game or application according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein NFC data may be any suitable data that is received, read or otherwise obtained by a communication device (e.g., apparatus 50) from another device (e.g., tags, transponders, etc.) when the communication device enters a proximity or short range of the device. The proximity between the devices when NFC data is exchanged may be 10 centimeters for example. However, it should be pointed out that other suitable proximities between devices may be employed for exchange of NFC data without departing from the spirit and scope of the invention.

As used herein, the terms, "tag", "tagging" or the like may refer to receipt of NFC data in an instance in which a communication device enters the proximity of another device. Also, as referred to herein the terms "NFC tag(s)", "radio-frequency identification (RFID) tags", "RFID tag(s)" and the like may be referred to interchangeably as a "tag(s)" or "transponder(s)". The tag may be capable of providing a communication device with data stored in the tag when the tag is read by a communication device upon entering the proximity of the tag. Additionally or alternatively, tags may receive and transmit data to another device when the tag is in the proximity of the device.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, embodiments of the invention may further include one or more additional communication devices, one of which is depicted in FIG. 1 as a third communication device 25. In some embodiments, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention. The second communication device 20 may be a mobile or fixed communication device. However, in one example, the second communication device 20 may be a server, remote computer or terminal such as a personal computer or laptop computer. In one embodiment, the third communication device 25 may include an NFC device such as a transponder, tag or the like that is configured to exchange NFC data with the mobile terminal 10 and/or the second communication device 20 when the mobile terminal and/or the second communication device are within a proximity, range or distance of the third communication device 25.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in an embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), and/or the like. In an embodiment, the network 30 may be a P2P network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), Near Field Communication (NFC), Bluetooth (BT), Infrared (IR) or any of a number of different wireline or wireless communication techniques, including LAN, Wireless LAN (WLAN), Worldwide Interoperability for Microwave Access (WiMAX), WiFi, Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ a short range communication module capable of receiving NFC data from a short range communication device (e.g., tag, transponder or the like). The NFC data received by the short range communication module from the short range communication device may be utilized in one or more electronic games or applications. In this regard, virtual objects associated with the NFC data may be incorporated into the electronic game(s) or application(s) and maybe shown on a display of a communication device.

FIG. 2 illustrates a schematic block diagram of an apparatus that may benefit from an example embodiment of the invention. An example embodiment of the invention will now be described with reference to FIG. 2, in which certain elements of an apparatus 50 for utilizing Near Field Communication to implement an electronic game or application are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a short range communication (SRC) module 71, an accelerometer 73 and an NFC application module 78. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, electronic games, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). In addition, the memory may store one or more translation tables (e.g., translation table 83) that may store one or more correlations between unique identifiers of NFC tags for example and virtual objects, virtual locations and any other suitable virtual data. This virtual data may be incorporated into an electronic game(s) or application(s).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the processor 70 may also be in communication with the display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

As shown in FIG. 2, the apparatus 50 may also include one or more means for sharing and/or obtaining data. For example, the apparatus 50 may comprise a short range communication (SRC) module 71 (also referred to herein as NFC module 71) that includes a short range radio frequency (RF) transceiver and/or interrogator 64 so data may be shared with and/or obtained from electronic devices in accordance with RF techniques. The apparatus 50 may comprise other short range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be configured to operate according to Wibree™ radio standards. In this regard, the apparatus 50 and, in particular, the short range communication module 71 may be capable of transmitting data to and/or receiving data from electronic devices (e.g., tags, transponders, etc.) within a proximity of the apparatus 50, such as within 10 centimeters, for example. However, the SRC module 71 may be capable of transmitting data to and/or receiving data from electronic devices within other suitable proximities such as, for example, 10 meters. Although not shown, the apparatus may be configured to transmit and/or receive data from electronic devices according various wireless networking techniques, including Wireless Fidelity (Wi-Fi), WLAN techniques such as IEEE 802.11 techniques, and/or the like. Additionally, it should be pointed out that in an example embodiment, the interrogator 64, the IR transceiver 66 and the BT transceiver 68 may each include an NFC reader (not shown) that is capable of reading and receiving a short-range communication or Near Field Communication upon interrogation by the NFC reader.

In an example embodiment, the short range communication module 71 may read NFC data from a device (e.g., tags, transponders, etc.) when the apparatus 50 enters a proximity of the device. The NFC data may be provided by the short range communication module 71 to the NFC application module 78 which may utilize the NFC data, in part, to implement an electronic game or application.

The apparatus 50 may include a media capturing element, such as a camera, video and/or audio module, in communication with the processor 70. The media capturing element may comprise any means for capturing an image, video and/or audio for storage, display or transmission. For instance, in an example embodiment in which the media capturing element comprises camera module 36, the camera module 36 may include a digital camera configured to form a digital image file from a captured image. In addition, the digital camera of the camera module 36 may be configured to capture a video clip. As such, the camera module 36 may include all hardware, such as a lens or other optical component(s), and software necessary for creating a digital image file from a captured image as well as a digital video file from a captured video clip. In an example embodiment, the camera module 36 may further include a processing element such as a co-processor configured to assist the processor 70 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The accelerometer 73 may be any device or means capable of measuring acceleration of the apparatus 50. Additionally, the accelerometer 73 may detect magnitude and direction of the acceleration and may detect orientation, and movement of the apparatus 50. In this regard, the accelerometer 73 may provide input of data to the NFC application module 78 indicating a position or movement (e.g., movement pattern) of the apparatus 50 so that the NFC application module 78 may utilize this data to associate an item(s) of virtual data with data read from one or more NFC tags.

In an example embodiment, the processor 70 may be embodied as, include or otherwise control the NFC application module. The NFC application module 78 may be any means such as a device or circuitry operating in accordance with software or otherwise embodied in hardware and software (e.g., processor 70 operating under software control, the processor 70 embodied as an ASIC or FPGA specifically configured to perform the operations described herein, or a combination thereof) thereby configuring the device or circuitry to perform the corresponding functions of the NFC application module 78 as described below. Thus, in one example in which software is employed, a device or circuitry (e.g., the processor 70 in one example) executing the software forms the structure associated with such means.

The NFC application module 78 may be any device or means that is able to receive NFC data from the SRC module 71, via the processor 70, and utilize the received NFC data to map the NFC data to virtual objects, virtual locations and any other suitable virtual data. The virtual data may be incorporated into one or more electronic games or applications by the NFC application module 78. Additionally, the NFC application module 78 may enable provision of display of the virtual data during execution of a corresponding electronic game(s) or application(s).

Referring now to FIG. 3, an example embodiment of a system for enabling provision of NFC data to be utilized in one or more electronic games or applications is provided. The system 8 may include a game kit that may be provided to users to enable them to play an unlimited number of interactive games and other applications using the same game kit. The game kit of system 8 may include one or more apparatuses 50 and one or more tags 28, 29 and 31 (also referred to herein as NFC tags 28, 29 and 31 or NFC cards 28, 29 and 31). For purposes of illustration and not of limitation, system 8 may include four tags 28, two tags 29 and two tags 31. However, any suitable number of tags 28, 29 and 31 may be included in system 8 without departing from the spirit and scope of the invention. It should also be pointed out that the tags 28, 29 and 31 may each represent distinct classes or types of tags. The tags may include one or more data fields having data (e.g., unique identifiers) that may be read and interpreted by the NFC application module 78 as corresponding to a virtual object(s), virtual location(s) or any suitable virtual information. The NFC application module 78 may read the data (e.g., identifiers) of the tags upon entering a proximity of the tags. The NFC application module 78 may include the virtual information corresponding to the data in an electronic game or application and may enable provision of display of the virtual information during execution of the game or application in a manner described more fully below. It should be pointed out that the data fields of the tags may, but need not, be writable. Additionally, the data fields may, but need not, include game-specific values. Moreover, at least some of the tags of an example embodiment may include arbitrary static data (e.g., values) which may be used in implementing a game or application as long as the data of the tags are unique. Moreover, in an example embodiment tags which may include pre-stored data (e.g., a unique ID) may be utilized by the NFC application module 78 to facilitate implementation of a game or application.

The tags 28 may, but need not, be embedded in game pieces (e.g., game piece 33 of FIG. 4) such as for example one or more cards, blocks, or other physical objects. Optionally, the game pieces may include one or more outputs such as for example a display (e.g., display 87 of FIG. 4) (e.g., the display may utilize e-ink, LEDs, LCDs, etc.) and one or more inputs such as, for example, a user input interface (e.g., user input interface 89 of FIG. 4) including one or more buttons, touch inputs, etc. In this regard, an example embodiment may provide an enhanced game play experience by enabling the apparatus 50 to display representations of a virtual world on a respective game piece. The apparatus 50 may enable display of representations of the virtual world on a respective game piece in response to the NFC application module 78 sending a message to the display of the game piece instructing the display to show the corresponding virtual world. Additionally, the input capability of the respective game piece may also be used to enable a user to set additional information about the virtual object represented by the physical game piece. For example, when a respective game piece is subsequently tapped by the apparatus 50, the data (e.g., a unique ID) that may be transmitted to the apparatus 50 by the game piece may be changed depending on the user's previous interactions with the inputs of the game piece.

The tags 28 may include information such as for example constant data (e.g., an identifier or number such as, for example, "1000"). As shown in the system of FIG. 3, there may be any suitable number of tags 28 such as, for example, one-hundred tags 28. In this regard for example, each of the one hundred tags 28 may include information such as, for example, constant data including IDs from "1" to "100," respectively. The constant data may be interpreted by the NFC application module 78 as corresponding to a virtual object(s), virtual location(s) or any other suitable virtual data that may be included in an electronic game(s) or application(s) by the NFC application module 78. Additionally, the tags 29 of the game kit of the system 8 may include information such as for example arbitrary constant data (e.g., an NFC identifier) that may, but need not, be associated with tags not specifically or initially made for a particular electronic game(s), application(s) or the like. In this regard, the tags 29 may include, but are not limited to, NFC enabled credit cards, transit cards, product tags, poster tags, etc. The NFC application module 78 may read the arbitrary constant data of the tags 29 and determine that the arbitrary constant data corresponds to one or more virtual objects, virtual locations, and any other suitable virtual data that may be included in an electronic game(s) or application(s). Additionally, the tags 31 may include, but are not limited to, user writable tags, smartcards or the like. A memory of the tags 31 may be written to by the apparatus 50. The tags 31 may also have identifiers that may be interpreted by the NFC application module 78 as corresponding to one or more virtual objects, virtual locations and any other suitable virtual data that may be incorporated by the NFC application module 78 into an electronic game(s) or application(s). It should be pointed out that although FIG. 3 shows a particular number of tags 28, 29 and 31, the system 8 may include any suitable number of tags 28, 29 and 31 without departing from the spirit and scope of the invention.

The apparatuses 50 may communicate with the network device 108 (e.g., a server (e.g., communication device 20)) and may exchange data with the network device 108. For example, the apparatuses 50 may receive software relating to one or more electronic games and/or applications from the network device 108. As another example, the apparatuses 50 may receive an upgrade to one or more electronic games and/or applications stored on the apparatuses 50. Additionally, the apparatuses 50 may communicate with each other. In this regard, the apparatuses may communicate with each other across network 30. Alternatively, the apparatuses 50 may communicate with each other directly via a Near Field Communication or short range communication by utilizing their NFC modules 71 to exchange data upon entering a particular proximity (e.g., 10 centimeters) of an apparatus 50.

Referring now to FIG. 4, an example embodiment of a tag is provided. The tag 27 may be an example of tags 28, 29 or 31. Optionally, the tag 27 may be embodied in a game piece 33 (also referred to herein as game token 33, game card 33). The game piece 33 may, but need not, be a card(s), block(s), sticker(s) or any other suitable physical object. The tag 27 (also referred to herein as "NFC tag 27", or "transponder 27") may include a transceiver such as a short range transceiver 81 having an antenna 80. The tag 27 may also include a processor 84 and a memory 82. The short range transceiver 81 may be configured to operate in accordance with one or more frequencies or one or more frequency bands. Additionally, the short range transceiver 81 may communicate with other electronic devices such as, for example, the apparatuses 50 as well as other electronic devices. In this regard, the short range transceiver 81 may communicate with other electronic devices according to RF, BT, IR or any other suitable short range or near field communication techniques. The short range transceiver 81 may communicate with the apparatuses 50 when an apparatus 50 is within a given proximity, range or distance of the tag 27. In this regard, the short range transceiver 81 may send one or more interrogation signals to a respective apparatus 50 when the apparatus 50 is within the proximity of the tag 27. The interrogation signals may excite or trigger the apparatuses 50 to read data (e.g., RF/NFC data signals) from the tag 27.

The memory 82 may store one or more instructions (e.g., programs) associated with one or more applications, electronic games or the like, unique identifiers (IDs) (e.g., constant IDs, arbitrary constant IDs, etc.), as well as any other suitable data. In one example embodiment, the memory 82 may be writable. In another alternative embodiment, the memory 82 may be readable, but may not be writable after being stored with data. Additionally, the memory 82 may store the unique identifiers in one or more corresponding data fields. It should be pointed out that when an apparatus 50 reads the tag 27, upon entering the proximity of the tag 27, the tag 27 may send information associated with a unique ID(s) stored in memory 82 to the apparatus 50. The NFC application module 78 of the apparatus 50 may determine that the unique identifier and/or any other suitable information received from the tag 27 corresponds to a virtual object, location or other virtual data which may be incorporated into an electronic game(s) or application(s) by the NFC application module 78. The processor 84 may be a controller or other processing element configured to execute instructions, which may be stored in memory 82 or perform other logical operations or functions of the tag 27 as described herein. The processor 84 may be embodied as an ASIC or an FPGA.

Optionally, the game piece 33 may include a display 87 and a user input interface 89. In an example embodiment, the display 87 may be electrophoretic ink (e-ink), liquid crystal display (LCD), light-emitting diode (LED) or other suitable display. In this regard, the display 87 may show items of virtual data in an electronic game or application in response to an instruction(s) from the processor 84 and/or the NFC application module 78. The user input interface 89 may include one or more buttons, touch inputs, etc. The user input interface 89 may be utilized by a user to set additional information about a virtual object(s) represented by the game piece 33, for example. In this regard, when the apparatus 50 taps a game piece 33, the data transmitted, via the processor 84, to the NFC application module 78 may be changed depending on the user's previous interactions with the user input interface 89.

Optionally, in an example embodiment, the display 87 and the user input interface 89 may be embodied entirely within the tag 27. It should be pointed out that the tag 27 may be passive with no internal power supply. Alternatively, the tag 27 may be passive with a power supply (not shown) that is for providing power to maintain the display 87 and/or receiving and storing user input sequences. In another alternative embodiment, the tag 27 may be active and may include an internal power source in which the processor 84 may execute, among performing other functions, software independently of the apparatus 50.

Referring now to FIG. 5, a block diagram of one example of a network device, such as network device 108 of FIG. 3 is provided. As shown in FIG. 5, the network device may include a processor 94 and an associated memory 96. The memory 96 may comprise volatile and/or non-volatile memory, and may store content, data and/or the like. Also for example, the memory 96 may store client applications (e.g., electronic games), instructions, and/or the like for the processor 94 to perform the various operations of the network device in accordance with embodiments of the invention, as described herein. The processor 94 may also be connected to at least one communication interface 98 or other means for transmitting and/or receiving data, content, and/or the like, as well as at least one user input interface 95. The user input interface 95 may comprise any of a number of devices allowing the entity to receive data from a user, such as a keypad, a touch display, a joystick or other input device. In this regard, the processor 94 may comprise user interface circuitry configured to control at least some functions of one or more elements of the user input interface.

The network device, for example a server (e.g., communication device 20), may transmit or send an application(s), electronic game(s) and any other suitable information to the apparatus 50 via a network, for example network 30 shown in FIG. 3. In one example embodiment, the network device may send an upgrade of an application(s), electronic game(s) or the like to an apparatus 50.

Game/Application Implementation

In order to utilize an example embodiment of the invention, a user of an apparatus 50 may use the apparatus to tap a game piece (e.g., game piece 33) (e.g., cards, blocks, etc.) containing NFC tags (e.g., NFC tags 28, 31). The user may also utilize the apparatus 50 to tap NFC tags (e.g., NFC tags 29) that may not be part of game pieces (e.g., standalone tags). The user may tap the game pieces or standalone NFC tags by bringing the apparatus 50 in a proximity of a game piece(s) or a NFC tag(s) so that the SRC module 71 may read the data of the corresponding tags. In response to reading the data of a tag(s), the SRC module 71 may provide the read data to the NFC application module 78. In one embodiment of the invention, the read data provided to the NFC application module 78 by the SRC module 71 may correspond to an identifier, a value or any other suitable data.

The NFC application module 78 may map the data (e.g., identifier) of the NFC tag(s) to one or more items of virtual data (e.g., a virtual object, a virtual location, etc.). In this regard, the NFC application module 78 may associate a respective NFC tag with one or more items of virtual data (e.g., virtual object (e.g., a virtual object depicting a character), virtual location, etc.).

The items of virtual data associated with the data and a corresponding NFC tag may be stored by the NFC application module 78 in the memory device 76. In an example embodiment, items of virtual data may be stored in a translation table 83 of the memory device 76 such that the items of virtual data may be referred to by the NFC application module 78 in response to a subsequent reading of data of a corresponding NFC tag. For instance, when the SRC module 71 detects the presence of a NFC tag 27, the SRC module 71 may read the data of the tag and provide the read data to the NFC application module 78. In this regard, the NFC application module 78 may perform a search of the corresponding data read from the NFC tag to determine whether the data (e.g., an identifier) is stored in a translation table 83 of the memory device 76. If the NFC application module 78 determines that the data read from the NFC tag is stored in the translation table 83, the NFC application module 78 may determine that there is a match and the NFC application module 78 may include an item(s) of virtual data (e.g., a virtual object depicting a monster) in a virtual world of an electronic game or an application. In this regard, the NFC application module 78 may utilize the item(s) of virtual data as game/application-specific data corresponding to an item(s) in the virtual world that may be represented by a game piece having a NFC tag or a standalone NFC tag.

On the other hand, if the NFC application module 78 determines that the data read from a corresponding NFC tag is not stored in the translation table 83, the NFC application module 78 may determine that there is not a match and may provide an error message to display 85. Additionally or alternatively, if the NFC application module 78 determines that the data read from a corresponding NFC tag is not stored in the translation table, the NFC application module 78 may include the data read from the corresponding NFC tag in the translation table 83 as a new entry and may assign or associate the data with an item(s) of virtual data (e.g., a virtual object, virtual location, etc.).

In this regard, the NFC application module 78 may include an item(s) of virtual data in a virtual world of an electronic game or an application when the item(s) of virtual data is associated with the data read from an NFC tag. The item(s) of virtual data may be provided to the display 85 and the user interface 67 during execution, by the processor 70, of the corresponding electronic game(s) or application(s). The item(s) of virtual data (also referred to herein as "game/application specific data") may be utilized by an electronic game according to the algorithms or software code of the electronic game to move the game play along, presenting information to the user via output interfaces (e.g., display, audio, vibrator, lights, etc.) of the apparatus 50. For example, visual data associated with the item(s) of virtual data may be shown on the display 85 and audio data associated with the item(s) of virtual data may be played via a speaker or the like of the user interface 67. Accordingly, the user of the apparatus 50 may interact with the item(s) of virtual data in a virtual world of an electronic game or application.

The user of the apparatus 50 may interact with the virtual world by performing any suitable action, including but not limited to utilizing the apparatus 50 to tap on corresponding game pieces having NFC tags or tapping standalone NFC tags, using keys, buttons, sensors or the like of the user interface 67 or any other suitable manner that may cause the apparatus 50 to react to the user's inputs via the display 85 and/or the user interface 67. Additionally, the user may interact with virtual objects in a virtual world based on receipt of data from other apparatuses 50, phones, servers, computers or other like devices, as described more fully below. In this regard, a user of an apparatus 50 may move an electronic game along by utilizing combinations of tapping game pieces having NFC tags, tapping standalone NFC tags, using the input interfaces of the apparatus 50 as well as by communicating with other apparatuses 50, phones, servers, computers or other like devices.

In addition to reading data corresponding to NFC tags, the NFC application module 78 may read data from a barcode or the like and perform the functions above in a similar manner.

In an example embodiment, an electronic game that enables the NFC application module 78 to incorporate items of virtual data into virtual objects of the game may be played by one or more users using one or more apparatuses 50.

It should be pointed out that the game pieces or standalone NFC tags do not need to have any physical visible marks that associate the game pieces/NFC tags with corresponding items of virtual data (e.g., virtual objects) in the virtual world. In this regard, some or all of the game pieces/NFC tags may look identical or arbitrary. However, the apparatus 50 (e.g., mobile terminal 10) may provide the visibility to item(s) of virtual data in a virtual world by reading the data of a corresponding NFC tag and incorporating the item(s) of virtual data into a corresponding electronic game or application such that the item(s) of virtual data may be shown on the display 85. In fact, for many games, part of the fun of the game play may be based on the virtual world being invisible to the user, until the user taps the apparatus 50 on a game piece(s) or NFC tag(s). In this regard, the apparatus may act as a "Magic Window" allowing a user to see into a virtual world even though no information may be determined from a corresponding real world object (e.g., a game piece(s), a NFC tag(s)).

In an example embodiment, the NFC module 71 may read data of more than one game piece or NFC tag at the same time. The reading of data of multiple game pieces or tags at the same time by the NFC module 71 may be dependent on the game play of an electronic game or application. The NFC module 71 may read data of multiple game pieces or tags at the same time when the game pieces or tags are in the same field of the apparatus 50 such that the NFC module 71 is capable of detecting and identifying a set of game pieces or tags in its field.

Mapping Data of Tags to Items of Virtual Data

There are various techniques for mapping data (e.g., values) of NFC tags to item(s) of virtual data by the NFC application module 78 which may include the item(s) of virtual data in a corresponding electronic game or application. For instance, the NFC application module 78 may automatically map data read from one or more tags to one or more items of virtual data based on an algorithm or software code of a corresponding electronic game or application. In this regard, the algorithm/software code may include instructions specifying that data (e.g., identifiers, values, etc.) in the translation table 83 are randomly assigned items of virtual data (e.g., virtual objects, virtual locations, etc.) upon initialization or start up of an electronic game or application. The NFC application module 78 may automatically map the data of one or more tags to items of virtual data according to an algorithm or software code of the corresponding electronic game or application in any other suitable manner.

Additionally, the NFC application module 78 may map items of virtual data with data read from one or more tags based on the order in which the tags are tapped by the apparatus 50. For instance, the NFC application module 78 may map data read from one or more tags to one or more items of virtual data based on an algorithm or software code of a corresponding electronic game or application. In this regard, the algorithm/software code may include instructions specifying that data read from a first tag is associated with a particular item of virtual data (e.g., a virtual object of a sword) and that data read from a second tag is associated with another item of virtual data (e.g., a virtual object of a room), so on and so forth.

As another example, the NFC application module 78 may map data of tags to items of virtual data based on one or more user inputs. For purposes of illustration and not of limitation, a user of an apparatus 50 may utilize a keypad or the like of the user interface 67 to select a particular item of virtual data (e.g., a virtual object of a submarine) shown on the display 85 and may tap a corresponding tag (e.g., tag 28) so that the SRC module 71 may provide the data of the tag to the NFC application module 78. The NFC application module 78 may then associate the data (e.g., an identifier) of the tag with the selected item of virtual data. The association between the data of the tag and the selected item of virtual data may be stored in the translation table 83. As another example, the accelerometer 73 may be utilized to detect a movement (e.g., up/down motion) of the apparatus 50 and the movement pattern may be provided to the NFC application module 78. In this regard, when the user utilizes the apparatus 50 to tap a corresponding tag (e.g., tag 28), the NFC application module 78 may associate the movement with the data read from the tag. As such, an item(s) of virtual data corresponding to the movement may be associated with the data of the tag and may be stored by the NFC application module 78 in the translation table 83. When the user utilizes the apparatus 50 to tap the corresponding tag, the NFC application module 78 may include an item(s) of virtual data corresponding to the movement (e.g., up/down movement of a sword, etc.) in an electronic game or application.

Additionally or alternatively, the NFC application module 78 may associate the movement with an item of virtual data such as, for example, a virtual object, virtual location, etc. In this regard, when the user utilizes the apparatus 50 to tap the corresponding tag, the movement associated with the tag may enable the NFC application module 78 to include a virtual object of a sword, submarine, etc. in an electronic game or application. As yet another example, the NFC application module may utilize an input from the camera module 36 to map the data of a corresponding tag. For instance, the user may select an image captured by the camera module 36 and may utilize the apparatus 50 to tap a corresponding tag (e.g., tag 29). In this manner, the data read from the tag may be associated with the selected image and stored in the translation table 83 by the NFC application module 78. As such, the NFC application module 78 may include an item of virtual data corresponding to the image in an electronic game or application when the corresponding tag is subsequently tapped by the apparatus 50. For purposes of illustration and not of limitation, the item(s) of virtual data may be a virtual object of a bridge corresponding to a bridge in the image.

The NFC application module 78 may also utilize a conversion algorithm (e.g., a hash algorithm) to map the data read from tags to items of virtual data that may be included in an electronic game or application. For instance, when the user utilizes the apparatus 50 to tap a corresponding tag, the data read from the tag by the SRC module 71 may be provided to the NFC application module which may convert the data to a value which may be stored in the translation table 83. Additionally, the value may be associated by the NFC application module 78 with an item(s) of virtual data (e.g., virtual object, virtual location, etc.) that may be included in an electronic game or application.

It should be pointed out that the foregoing techniques may also be applied to data read by the NFC application module 78 from one or more barcodes or the like in addition to reading data of NFC tags.

Example Games of An Example Embodiment

In one example embodiment, the apparatus 50 may execute one or more electronic games, as described more fully below. The example games are described herein for purposes of illustration and not of limitation. For instance, in an example embodiment of the invention, the apparatus 50 may execute one or more applications or the like and is not limited to implementation of the example games described herein.

It should be pointed out that in an example embodiment, the apparatus 50 may execute one or more electronic games based in part by using the NFC data of the NFC tags 28, 29, 31 (also referred to herein as cards 28, 29, 31) in the manner described more fully below. It should be pointed out that the rules for the electronic games may be arbitrary. Additionally, tapping of cards does not have to be performed by a single player (e.g., user of an apparatus 50). Instead, an electronic game may require one player to make a first tap of a card and a second player make a second tap of a card, etc. Also, different electronic games may allow players to use the same apparatus 50 or use separate apparatuses 50. In one example embodiment, the electronic games may be implemented on an apparatus 50 and/or on another device (e.g., network device 108, another apparatus 50, etc.) that the apparatus 50 may be communicating with.

A. Battleship Game

For purposes of illustration and not of limitation, in an example embodiment, an apparatus 50 may be able to execute an electronic game referred to herein as a "Battleship Game." In the Battleship Game various tags may be utilized. The game pieces may be unmarked or blank cards (e.g., tags 28) arranged in a grid. Since the cards may be unmarked, a player may not know what virtual data, if any, is associated with the cards by visibly looking at the cards. Instead, virtual data associated with the cards may be displayed via display 85 in response to the apparatus 50 tapping a corresponding card. The unmarked cards may be arranged in a grid (e.g., a 10×10 grid) by a user of an apparatus 50. For instance, the user may lay out the cards arranged in a grid on a table or the like. In this regard, the virtual world may be a grid space, with hidden battleships occupying spaces in the grid. The NFC application module 78 may reveal whether a battleship(s) exists in a location(s) corresponding to a card(s) and may show the battleship(s) being hit on the display 85, as described more fully below.

A player may designate areas in the grid where the player desires to hide one or more battleships. For instance, at startup or initialization of the Battleship Game, the NFC application module 78 may generate a prompt provided to the display 85 requesting a player to tap respective cards in the grid in which to hide a virtual object(s) of a battleship(s). For example, a player may tap three adjacent cards of a top row of the grid to designate as corresponding to a hidden battleship. For multiplayer games, a second player may designate one or more hidden battleships in a similar manner. Once a player has designated where one or more battleships are hidden in the grid, a player may attempt to shoot the hidden battleships. In this regard, a player may fire a shot by tapping a corresponding card. In the example above, when a player taps one of the three adjacent cards of a top row of the grid, the NFC application module 78 may enable display of an explosion shown on display 85 denoting that at least part of a hidden battleship has been shot.

When the Battleship Game is a multiplayer game, the explosion may be shown on an apparatus 50 of player one and an apparatus 50 of player two in an embodiment in which both players have their own apparatuses 50. However, it should be pointed out that the Battleship Game may be played in multiplayer mode by using a single apparatus 50 when player one and player two take turns firing shoots at the grid by tapping corresponding cards. In an instance in which the Battleship Game is being played in a multiplayer mode and player one and player two have their own apparatuses 50, it should be pointed out the apparatuses 50 may communicate with each other via network 30. Alternatively, the two apparatuses 50 may utilize the SRC module 71 to communicate directly (e.g., bypassing network 30) with each other via short range communication when the apparatuses 50 are within a proximity of each other.

In an instance in which a player (e.g., player one) shoots all three of the adjacent cards in the top row of the grid, for example, the corresponding hidden battleship may be sunk. In this regard, for example, the NFC application module 78 may enable the display 85 to show virtual data in a virtual world corresponding to an explosion of the hidden battleship and the display 85 may show an animation, video or the like of the battleship sinking. In a single player mode, it should be pointed out that the Battleship Game may end when the either the artificial intelligence (also referred to herein as CPU) of the Battleship Game, executed by processor 70, sinks all of a player's hidden battleships or the player sinks all of the hidden battleships of the CPU. Alternatively, in an instance in which the Battleship Game is played in a multiplayer mode, the Battleship Game may end when all of one player's battleships have been sunk.

In an alternative example embodiment of the Battleship Game each game piece may include a display and at the start of the game each game piece may be blank. As described above, a player may shoot at a battleship by tapping the apparatus on a respective game piece. In this regard, the NFC application module 78 may indicate whether the shot was a hit or a miss by enabling display of an explosion corresponding to a hit or a splash corresponding to a miss on the display 85 and may optionally play corresponding audio data. In this example embodiment each game piece may have a display and as such the NFC application module may send an instruction to the game piece to display an explosion or splash. In this manner, the display of the explosion or splash may remain on the game piece even after the apparatus 50 is moved from a proximity of the respective game piece thus enabling the user to easily see where shots may have been already made in the physical space.

B. Virtual Adventure Game

For purposes of illustration and not of limitation, in an example embodiment, an apparatus 50 may be able to execute a Virtual Adventure Game. In the Virtual Adventure Game various tags or game pieces may be utilized. In this regard, game pieces may correspond to unmarked or blank cards (e.g., cards 28, 29, 31) laid out in a playing space either in an arbitrary order/placement (e.g., randomly in which each card may be placed anywhere) or in a specified order. In an instance in which the cards may be laid out in the specified order, each card may be associated with a number that may be stored in a memory (e.g., memory 82) and each card may be placed in a specific physical location (e.g., placed on a table by a user) in the real world according to the associated number.

It should be pointed out that the data (e.g., identifiers) of the cards of the Virtual Adventure Game may be associated, by the NFC application module 78, with one or more items of virtual data. In particular, some of the cards of the Virtual Adventure Game may represent virtual locations in a virtual world of the game. For example, a card may be associated with a virtual location of a castle. Another card may be associated with a dungeon, for example. Additionally, some of the cards may represent virtual objects such as for example weapons, dragons, a character (e.g., a knight, a monster), etc. When a card is tapped by the apparatus 50, a virtual location (e.g. a virtual location of a room such as, for example, a dungeon) may be provided to the display 85, by the NFC application module 78, as the Virtual Adventure Game progresses. In this regard, when a card representing a location is tapped by the apparatus 50, the NFC application module 78 may enable display of the contents of the location in the virtual world. Once inside the virtual location (e.g., room), the user may utilize the apparatus 50 to tap another card that may be associated with a virtual object (e.g., weapon). In this regard, a character that the user (e.g., a knight) is interacting with in the Virtual Adventure Game may be provided with a weapon such as, for example, a sword to fight a monster or the like in the room (e.g., a dungeon).

In an example embodiment, when the user utilizes the apparatus to tap adjacent cards that may be laid out in a playing space, the NFC application module 78 may enable provision of display of items of virtual data corresponding to adjacent rooms in the virtual world of the Virtual Adventure Game as the game progresses. Players may be able to interact with the contents of the rooms by utilizing the display 85 and/or the keyboard, joystick or the like of the user interface 67.

In an alternative example embodiment of the Virtual Adventure Game each of the game pieces may have a display. In this regard, the display of the game pieces may be capable of displaying a representation of an item of virtual data (e.g., a virtual object, virtual location, etc.). The game pieces may be initialized during an initialization of the game, while the user is assigning items of virtual data to game pieces, for example. As a user plays the Virtual Adventure Game and taps on the game pieces, changes in the condition of items of virtual data represented by the game pieces may be displayed not only via display 85 of the apparatus 50 but also on respective game pieces. It should be pointed out that the representation on the game pieces need not be the same as that shown on display 85 of the apparatus 50. Additionally, the items of virtual data may remain on the display of the game pieces even when the apparatus 50 may be removed from a proximity of the game pieces.

Additionally, the game pieces may include a user input interface including one or more buttons, touch input or the like which may be utilized to enhance game experience by enabling the use of these inputs while using game pieces. For example, in an embodiment in which a game piece represents a monster, then the game piece's input buttons may represent different parts of the monster that the user may aim an attack towards (e.g., a head, a torso, legs, etc.). In order to attack, a user may press a button represent where the user wishes to attack, and then the user may tap the apparatus 50 on the respective game piece. Alternatively, the user may press the button while tapping the apparatus on the game piece to represent where the user desires to attack.

In one embodiment, the NFC module 71 may detect identification of multiple NFC tags, in a field of the apparatus 50, at the same time. In this regard, players of the Virtual Adventure Game may vary the interactions of game pieces and the apparatus 50 by placing game pieces or NFC cards on top of each other. For purposes of illustration and not of limitation, in order to add a weapon to a knight, for example, a player may take a card corresponding to a weapon and put it on top of a card corresponding to a knight such that when the apparatus 50 taps the card corresponding to the knight, both cards may be detected by the NFC module 71 in one field. As such, the NFC module 71 may provide data detected by both cards to the NFC application module 78, which may enable display of a virtual object of the weapon being added to a virtual object of the knight shown on display 85 in a virtual world of the game. Also, a processor (e.g., processor 84) of the cards may, but need not, utilize data of the cards relating to the virtual object of the knight and the virtual object of the weapon to enable display (e.g., via display 87) of the weapon being added to the knight. As another example, in order to move a virtual object of a knight into a virtual object of a particular room, a player may put a card corresponding to the virtual object of the knight on top of a card corresponding to the virtual object of a room and then utilize the apparatus 50 to tap both cards at the same time. In this regard, the NFC application module 78 may enable display of the knight in the room in a virtual world of the game, in a manner analogous to that described above. In addition, the processor of the cards may enable display of the knight in the room, in a manner analogous to that described above.

It should be pointed out that many other electronic games or applications may be provided by an example embodiment of the invention in which the electronic games or applications may utilize the apparatus 50 and NFC as a virtual or "Magical Window" that may give the user the feeling of being able to look into a virtual world by tapping or holding an apparatus 50 near a physical real world game piece(s) or card(s).

Assigning Values & Meaning to the Translation Table

There may be different ways for the NFC application module 78 to assign translations in the translation table 83 according to an example embodiment. In this regard, different mechanisms may be applied by the NFC application module 78 depending on one or more constraints, as described more fully below. These constraints may be based on the data included in NFC tags, the manner in which the translation table 83 may be constructed and the manner in which the translation table 83 may change during the course of an electronic game or during implementation of an application.

A. Non-User Writable Tags Having Constant Data

In one example embodiment, non-user writable tags that may have constant data may be utilized to assign translations that may be stored in the translation table. In this regard, in an example embodiment, some of the NFC tags (e.g., NFC tags 28) may have a memory (e.g., memory 82) that may not be writable by the apparatus 50. However, the memory of these NFC tags may be pre-stored with constant values written into the tags at some point before the tags may be provided to the user of the apparatus 50. For purposes of illustration and not of limitation, these NFC tags (tags 28) may, but need not, be written to by a developer of an electronic game or application or another entity. For example, the developer of the game or another entity may write data corresponding to a number (e.g., "1") for each NFC card (e.g., a first NFC card) of a set of NFC cards (e.g., a set of 100 NFC cards). However, the apparatus 50 may be unable to write to the memory of these NFC tags.

The NFC application module 78 may read the data (e.g., an identifier) previously written on each NFC tag and may translate the data to a more complex game object that may be stored by the NFC application module 78 in the translation table 83. The data previously written to an NFC tag (e.g., NFC tags 28) may be particular (also referred to herein as piece-specific) to the corresponding NFC tag or it may be generic.

An example of data particular to the corresponding NFC tag may be a data string that indicates "apple". This piece-specific data may be used in a game to represent a tag or card corresponding to an apple. When the NFC application module 78 detects the corresponding card and reads the memory of the card, the NFC application module 78 may translate the data indicating "apple" into an image of an apple that may be stored in the memory device 76 by the NFC application module 78.

An example of generic data of an NFC tag may be the number "1". In an example embodiment, the NFC application module 78 may change the meaning of the number "1" depending on the electronic game or application. For example, in one instance of a game, the NFC application module may designate that "1" means "apple". However, during a second instance of the game, the NFC application module 78 may designate that "1" means "banana", so on and so forth. In this regard, the meaning of the data of the tag may be assigned by the NFC application module 78 which may be dynamically generated at the beginning of a new game or at startup of an application.

Another example of generic data (e.g., an identifier) may be an x, y coordinate pair, representing a location in a virtual world. For example, each NFC card may be physically marked with x, y coordinate pairs and the NFC application module 78 may generate a prompt that may be provided to the display 85 to instruct the user of the apparatus 50 to lay out the cards (e.g., on a table or the like) according to their x, y coordinates. The user may then play the Virtual Adventure Game, for example, utilizing the cards laid out in this fashion. In this regard, when the user utilizes the apparatus 50 to tap a card, the SRC module 71 may read the x, y coordinates of the tags. The NFC application module 78 may lookup the contents at those coordinates in a virtual world (e.g., the contents of a room at those coordinates).

It should also be pointed out that the x-y coordinates may also be determined by the NFC application module 78 by utilizing single number identifiers. For instance, an m-by-n grid may be utilized by the NFC application module 78 using tags numbered from 1 to m-times-n. In this regard, the NFC application module 78 may instruct the user to lay out the cards in an m-by-n grid in row-major order and the apparatus 50 may then translate the corresponding single number IDs to the x, y coordinates based on the values of m and n. As an example, consider an instance in which 100 NFC cards may be laid out in a 10×10 grid. The x coordinate may correspond to the row and the y coordinate may correspond to the column of the 10×10 grid. In this regard for example, a NFC card having a number identifier such as 76 may be positioned at row 7 and column 6 in the 10×10 grid and thus the NFC application module 78 may determine that the x coordinate for card 76 is "7" and that the y coordinate for card 76 is "6". As such, the NFC application module 78 may determine that the x, y coordinates for the NFC card assigned number 76 is (7, 6).

It should be pointed out that using generic data (e.g., identifiers), in one embodiment, may provide more flexibility than using piece-specific data in the NFC tags, since generic data may enable the NFC application module 78 to implement any suitable number of different electronic games or applications using the same game pieces or the same standalone NFC tags.

In this regard, the game kit of the system 8 described above in which a user may receive an apparatus(es) 50 and a set of NFC tags (e.g., NFC tags 28) with data (e.g., identifiers) numbered from 1 to 100 corresponding to each NFC tag may be utilized by the NFC application module 78 to generate any number of different games involving up to 100 different game objects or locations by receiving a new game for example from network device 108. In response to receiving a new game from the network device 108 or in any other suitable manner, the NFC application module 78 may associate the data of the tags with items of virtual data that may be incorporated into the electronic game or application.

B. NFC Tags Having Non Writable Constant Arbitrary Data

In another example embodiment, NFC tags that may have non writable constant arbitrary data may be utilized to assign translations that may be stored in the translation table 83. In this regard, in an example embodiment, NFC tags (e.g., NFC tags 29) that include arbitrary data may be utilized even though the tags may not be writable and may be unable to be specified by a developer of an electronic game or application. In this regard, the NFC tags may be written by a manufacturer or the like of the NFC tags, but other entities such as, for example, a game/software developer may be unable to write data to the NFC tags. Although these NFC tags may not be written to by entities other than a manufacturer of the NFC tags for example, these NFC tags may have unique identifiers and these unique identifiers may be utilized to play electronic games or applications without requiring users to utilize a specific game kit. In this regard, a user of an apparatus 50 may be able to play electronic games or applications utilizing the user's existing NFC cards including, but not limited to, NFC enabled credit cards, posters, transit cards, NFC tagged game pieces from some other game set, etc. It should be pointed out that in instances in which the NFC card corresponds to an NFC enabled credit card, that the SRC module 71 may not read the financial information (e.g., account number) of the credit card, but instead may read the unique NFC identifier of the credit card. A number of ways to utilize existing NFC cards of a user, which may include constant arbitrary data, to implement a game or application are described more fully below in sections B.1, B.2 and B.3.

B.1 Mapping Based on Data of NFC Tags & Order in which Tags are Tapped

In one example embodiment, the manner in which arbitrary constant data of NFC tags may mapped and the order in which the NFC tags may be tapped may be utilized to assign translations that may be stored in the translation table 83. In this regard, the SRC module 71 may read the data of the NFC cards having arbitrary constant data that may not be specifiable by a game or application developer. In response to reading the data of a respective NFC card (e.g., NFC tag 29), the SRC module 71 may provide the NFC application module 78 with the data (e.g., a unique NFC ID) and may map each tag's data to a number corresponding to tags that may be placed in an order for tapping by the apparatus 50. For instance, data (e.g., a unique NFC ID) of a first card that may be tapped by the apparatus 50 may be mapped by the NFC application module 71 to a value such as for example "1". Similarly, data of a second card that may be tapped by the apparatus 50 may be mapped by the NFC application module 78 to a value such as for example "2" so on and so forth. The NFC application module 78 may then associate the values of "1" and "2" (corresponding to the example above) with respective items of virtual data, in a manner analogous to that described above. In this manner, the NFC application module 78 may set up a game in an instance in which a user of the apparatus 50 may lay out the cards and tap the cards in sequence before starting the game. This approach may also be utilized for games or applications involving x, y coordinates in the manner described above.

Alternatively, in electronic games or applications in which the lay out or specific order of the cards may be insignificant, and where some randomness in the contents (e.g., unique identifiers) of the NFC cards does not affect the game play or algorithms/software of the application, it may be unnecessary for the user to tap all the cards before starting the game or application. Instead, the user may utilize the apparatus 50 to start playing the game or application, and the NFC application module 78 may keep track of the tags and their tapping order position accordingly. For instance, the NFC application module 78 may store data in the memory device 76 signifying the order in which the NFC cards were tapped. If the user utilizes the apparatus 50 to tap a card that the apparatus 50 has previously communicated with, then that card's original tapping order position may be used. For example, if the user utilizes the apparatus 50 to tap a first card having data that was translated to a value of "1" and the user subsequently utilized the apparatus 50 to tap that card again, the corresponding item(s) of virtual data, associated with the translated value of "1" may be incorporated by the NFC application module 78 into the electronic game or application. On the other hand, if the user utilizes the apparatus 50 to tap a card that the apparatus 50 has not yet communicated with, then the tapping order position may be incremented and associated with the data (e.g., unique ID) of the new card.

For example, utilizing this approach, the NFC application module 78 may implement an electronic game or application in an instance in which a user may lay out NFC tags (e.g., NFC tags 29) and utilize the apparatus 50 to tap the tags so that the NFC application module 78 may include an item(s) of virtual data, associated with the corresponding tags, in the electronic game or application.

It should also be pointed out that the order in which to tap the NFC tags may be determined by the NFC application module 78 which may be provided to the display 85 via one or more prompts. For purposes of illustration and not of limitation, the NFC application module 78 may take a user through a sequence by providing a prompt to the display 85 requesting the user of the apparatus 50 to tap a card representing a character in the game, for example. Next, the NFC application module 78 may generate a prompt provided to the display 85 instructing the user to tap a card that may represent a monster in the game, so on and so forth.

B.2 Mapping Data Using NFC Tags & User Input(s)

In another example embodiment, the manner in which arbitrary constant data of NFC tags may be mapped and receipt of selection of one or more user inputs may be utilized to assign translations that may be stored in the translation table 83. In this example embodiment, the meaning of data (e.g., unique ID) of each NFC tag may be associated with a game object depending on input from a user. For example, the user may utilize the keyboard of the like of the user interface 67 to select a virtual object on the display 85 and then tap a corresponding NFC card. In response, the NFC application module 78 may associate the NFC card's unique NFC data (e.g., unique NFC ID) with a virtual object (e.g., virtual object of a monster) in the game or application. It should be pointed out that the specific characteristics (e.g., a fighting style) of the virtual object (e.g., virtual object of the monster) may or may not be controllable by a user of the apparatus 50 during execution of the corresponding electronic game or application.

Alternatively, the user may move the apparatus 50 in a particular manner and then tap a NFC tag. In this regard, the accelerometer 73 may provide the NFC application module 78 with the movement and the NFC application module may assign an item(s) of virtual data to the corresponding NFC tag in response to the user's movement of the apparatus 50. As another example, the user of the apparatus 50 may utilize the camera module 36 to capture an image which the user may select to be provided to the NFC application module 78 and subsequently the user may utilize the apparatus 50 to tap a corresponding NFC tag. In this regard, the NFC application module 78 may associate the corresponding NFC tag with an item(s) of virtual data in response to the user's selection of the image.

The approach of utilizing user input, in part, for the assignment of items of virtual data may be applied to a multiplayer game. For example, a user may be prompted by the NFC application module 78 to input or select data associated with a specific value (e.g., select a monster) by utilizing the user interface 67 and then to utilize the apparatus 50 to tap a corresponding NFC card. The NFC application module 78 may remember the NFC card's unique data (e.g., a unique NFC ID) and the specific value (e.g., selected monster) input or selected by the user. As such, the apparatus 50 may transmit this translation, of the unique data of the NFC card to the specific value (e.g., selected monster), to a network entity such as, for example, network device 108. In this regard, in an instance in which a second user taps on the corresponding NFC card, the apparatus 50 of the second user may look up the translation by connecting to the network device 108 and then retrieve the monster selected by the first user. The apparatus 50 of the second user may then receive a virtual object of the monster selected by the first user from the network device 108 and the NFC application module 78 may enable the second user to interact with the virtual object of the monster.

B.3 Mapping Data of NFC Tags Using a Conversion Algorithm(s)

In another example embodiment, the manner in which arbitrary constant data of NFC tags may be mapped by a conversion algorithm(s) may be utilized to assign translations that may be stored in the translation table 83. In this regard, in an example embodiment, the NFC application module 78 may utilize a conversion algorithm(s) to convert arbitrary data (e.g., a unique NFC ID) of NFC tags (e.g., NFC tags 29) to a range or another acceptable value(s). In this regard, the converted value(s) may be stored in the translation table 83 and may be associated with a corresponding item(s) of virtual data that may be included, by the NFC application module 78, in an electronic game or application. For purposes of illustration and not of limitation, presume that unique data of a NFC tag corresponds to text such as, for example, "Central Square Bus Stop". The SRC module 71 may read this data of the NFC tag and when the apparatus is within a proximity of the tag and the SRC module 71 may provide this data to the NFC application module 78 which may apply the conversion algorithm(s) to convert the text to a value such as, for example, "47". The NFC application module 78 may store the value in the translation table 78 and may associate the value with an item(s) of virtual data (e.g., virtual object, virtual location, etc.) that may not necessarily be related to the original value.

It should be pointed out that the NFC application module 78 may utilize the conversion algorithm(s) to enable one or more random objects that may not be paired with other objects of a game to be utilized and included in the electronic game or application. For instance, when a user utilizes the apparatus 50 to tap a NFC tag, the NFC application module 78 may enable display of a randomly generated virtual object (e.g., a virtual object of Monster A) that may be included in a game. If the user utilizes the apparatus 50 to tap another NFC tag, the NFC application module 78 may enable display of another randomly generated virtual object (e.g., a virtual object of Monster B) that may be included in an electronic game. This approach may be beneficial in games where, for example, part of the fun involved relates to the kind of random object (e.g., monster) that may be generated by the NFC application module 78 by utilizing the apparatus 50 to tap a NFC card (e.g., NFC tag 29) having constant arbitrary data such as a NFC enabled credit card, NFC enabled ID card, or the like.

C. Using NFC Tags with User Writable Data

In another example embodiment, NFC tags may include user writable data that may be utilized to assign items of virtual data that may be stored in respective NFC tags as well as in the translation table 83. In this regard, in an example embodiment, the apparatus 50 may be able to write information onto user writable NFC tags (e.g., NFC tags 31). The user writable NFC tags may include, but are not limited to, NFC enabled smartcards. Examples of NFC enabled smartcards may include but are not limited to, integrated circuit cards (ICCs), microprocessor cards, etc. The NFC enabled smartcards may include memory (e.g., memory 82) such as, for example, a non-volatile memory and a processor (e.g., processor 84) for implementing functions such as, for example, functions associated with software, computer instructions, a program or the like. The memory of the NFC enabled smartcards may be re-writable. An example embodiment of the invention may utilize a number of approaches described more fully below, in section C.1, to write information to the user writable NFC tags (e.g., NFC tags 31).

C.1. Writing Data to the NFC Tags

In one example embodiment, data may be written to NFC tags for implementation in an electronic game or application. In this example embodiment, the NFC application module 78 may write data to and read data from corresponding NFC tags (e.g., NFC tags 31). In this regard, the NFC application module 78 may select items of virtual data corresponding to an electronic game or application to be written to NFC tags. For purposes of illustration and not of limitation consider an example in which a NFC tag may include data corresponding to a room in an electronic game. The NFC application module 78 may write data to the NFC tag to include a virtual object relating to a monster for example. In this regard, in an instance in which the user utilizes the apparatus 50 to tap the corresponding NFC tag, the NFC application module 78 may enable display of the items of virtual data such as the room with the monster in this example. By enabling the NFC application module 78 to write data to the NFC tags 31, for example, the NFC application module 78 may not need to translate received data that may be read from a NFC tag so that the data may be associated with an item(s) of virtual data. Instead, the NFC application module 78 may receive data read by the SRC module 71 from a corresponding NFC tag and may utilize the read data to associate the data with an item(s) of virtual data. The game object data may itself include information (e.g., an identifier), and the tag may contain x, y coordinates together with the contents of that location in the virtual world.

One benefit of enabling the NFC application module 78 to write data to the NFC tags 31 may relate to changes with respect to an item(s) of virtual data that may be included in a virtual world of a game in which the changes may be provided to an apparatus 50 of a second player without requiring the apparatus 50 of the second player to have any contact with the apparatus 50 of a first player or with a server such as, for example, network device 108. For instance, the apparatus 50 of the second player may be able to read changes written to an NFC tag by the apparatus 50 of the first player directly from the corresponding NFC tag itself. As an example, a first player playing a game may kill a monster in a virtual room and may subsequently utilize an apparatus 50 to tap the corresponding NFC tag to write data to the NFC tag indicating the monster in the room is dead. Thereafter, when the second player utilizes an apparatus 50 to tap the corresponding NFC tag, the NFC application module 78 may enable the display 85 to show that the monster is already dead.

It should be pointed out that in an instance in which an NFC tag may be an NFC enabled smartcard, the NFC application module 78 may interact with a program, computer code, software instructions or the like executing on an NFC tag (e.g., NFC tag 31) and may communicate with the NFC tag. In one embodiment, the NFC application module 78 may communicate with the corresponding NFC tag by writing data to the NFC tag. As an example, consider a situation in which an NFC tag may include a program representing a virtual object such as a monster. The NFC application module 78 may interact with the virtual object of the monster on the NFC tag by sending data to the NFC tag that may be written to the memory of the NFC tag. In this regard, the processor (e.g., processor 84) in the NFC tag may receive this data and write the data to a memory of the NFC tag and may change the state of the monster based on the received data. Additionally, the processor of the NFC tag may enable the NFC tag to send the data associated with the new state of the monster as well as any other characteristics of the monster to the NFC application module 78. As such, the NFC application module 78 may include the received data (e.g., data relating to the new state of the monster) in a corresponding game or application. In the example above, the NFC application module 78 may share a common application program interface (API) which may allow the interactions between the NFC application module 78 and the NFC tag.

In an example embodiment, NFC tags corresponding to NFC enabled smartcards or the like (e.g., NFC tags 31) or the like may have an output device (e.g., a display) that the user may interact with. In this regard, the display of the NFC tags may display representation of a virtual world, which may remain displayed even after the user moves an apparatus away from a proximity of the NFC tag. Additionally, in an embodiment in which the NFC tag also includes a user input interface, then the NFC tag may send different data (e.g., different unique IDs) to the apparatus 50 depending on the user's previous or current interactions with the user input interface.

It should be pointed out that additional players that utilize an apparatus 50 to tap the corresponding NFC tag may receive the data associated with the new state of the monster as well since this data was written to the memory of the NFC tag by its processor 84. In this regard, an advantage of writing data directly into an NFC tag may be that communication with a device via a network (e.g., network 30) is not required. Additionally, by utilizing techniques for updating programs on an NFC enabled smartcard (e.g., an NFC tag 31), the NFC application module 78 may enable reprogramming of a program on the NFC enabled smartcard by performing a write operation. By performing the write operation, the NFC application module 78 may write additional data onto the NFC enabled smartcard to reprogram the smartcard.

Furthermore, it should be pointed out that the apparatus 50 may receive data from a memory that is external to the apparatus 50, for example, from a memory 96 of the network device 108. Additionally or alternatively, the NFC application module 78 may transmit data associated with the translation table 83 to other apparatuses 50, network device 108 or other suitable devices. The data in the translation table 83 that may be sent to the other apparatuses 50, network device 108 and other devices may be utilized by these devices to facilitate implementation of multiplayer games, for example.

It should also be pointed out that game pieces of different types (e.g., game pieces having NFC tags with constant data, arbitrary data and writable or smartcards tags) may be combined in an example embodiment of the invention. For example, in an adventure game, NFC tags having constant data may be utilized by the NFC application module 78 to represent locations (e.g., rooms) in a virtual world. Also, NFC tags with arbitrary data (e.g., unique IDs of credit cards) may be utilized by the NFC application module 78 to provide random (or surprise) elements like monsters or power-ups, for example. Optionally, user writable NFC tags and NFC tags corresponding to NFC enabled smartcards may be provided in a game kit of system 8 to allow games that may be played without requiring online connectivity (e.g., in order to conserve network resources). If a user's budget allows, it may be beneficial to use writable tags in the game kit since these tags may utilize constant data and arbitrary data and may not require online connectivity in some instances. In addition, in one embodiment game pieces may take different forms, for example, cards like standard playing cards, stickers that may be attached to physical objects, etc.

As described above, in an example embodiment, one or more interactions involving multiple game pieces or NFC cards may be tapped and detected by the apparatus 50 at the same time. The multiple game pieces/NFC cards may include different items of data (e.g. different identifiers). As such, in an example embodiment, the NFC module 71 may utilize an anti-collision mechanism that enables the NFC module 71 to detect and identify multiple NFC tags in the same field. In this manner, the NFC application module 78 may receive a set of more than one item of data (e.g., identifiers) from the NFC module 71. The NFC application module 78 may translate each of these items of data into respective items of virtual data that may be included in the virtual world of an electronic game or application.

Referring now to FIG. 6, an example embodiment of a flowchart for using NFC to implement an electronic game or application is provided. At operation 600, apparatus 50 may include means, such as the SRC module 71, the NFC application module 78, the processor 70 and/or the like, for receiving data (e.g., a unique ID) from a device (e.g., NFC tag 27) via a Near Field Communication. At operation 605, the apparatus 50 may include means, such as the NFC application module 78, the processor 70 and/or the like, for determining whether the received data was previously detected. At operation 610, the apparatus 50 may include means, such as the NFC application module 78, the processor 70 and/or the like, for identifying an item(s) of virtual data that may be mapped to the received data in response to determining that the received data was previously detected and stored. In an example embodiment, the received data may be stored in a translation table (e.g., translation table 83).

At operation 615, the apparatus 50 may include means such as, the NFC application module 78, the display 85, the processor 70 and/or the like, for enabling provision of display of the item(s) of virtual data in a virtual world of an electronic game or application. Thereafter, the apparatus 50 may enable a user to interact with the item(s) of virtual data in the virtual world. At operation 620, the apparatus 50 may include means, such as the NFC application module 78, the processor 70 and/or the like, for assigning the received data a meaning relating to the electronic game or application and may associate the received data with an item(s) of virtual data in response to determining that the received data is being detected for the first time. At operation 625, the apparatus 50 may include means, such as the NFC application module 78, the display 85, the processor 70 and/or the like, for enabling provision of display of the item(s) of virtual data in a virtual world of the electronic game or application. Optionally, at operation 630, the apparatus 50 may include means such as, the NFC application module 78, the display 85, the user interface 67, the processor 70 and/or the like, for enabling a user of the apparatus 50 to interact with the item(s) of virtual data in the virtual world.

As described above, some example embodiments may enable provision of interactive applications and games as well as accessories that may enable the applications/games. In this regard, in some example embodiments one or more game kits are provided in which the game kits may be composed of physical objects such as, for example, one or more cards including NFC tags. The game kit(s) of some example embodiments may be utilized with a wide variety of games.

Referring now to FIG. 7, an example embodiment of a system including a game kit is provided. The game kit 9 may include one or more NFC tagged game tokens 3, one or more NFC cards 5, one or more NFC tagged building blocks 7, one or more NFC cards 12, one or more NFC cards 15, and/or a NFC game board 11 (also referred to herein as play sheet 11). The NFC game board may include one or more embedded NFC tags. Optionally, the game kit 9 may include one or more game boards that may not include embedded NFC tags and the game kit 9 may include one or more sleeves 14. Although the game kit 9 of FIG. 7 shows one sleeve 14, one NFC card 15, one game board 11, six NFC tagged game tokens 3, four NFC cards 5, six NFC tagged building blocks 7 and three NFC cards 12, it should be pointed out that any suitable number of sleeves 14, NFC cards 15, game boards 11, NFC tagged game tokens 3, NFC cards 5, NFC tagged building blocks 7 and NFC cards 12 may be part of the game kit 9 without departing from the spirit and scope of the invention.

In the example embodiment of FIG. 7, each of the NFC tagged game tokens 3, the NFC cards 5, the NFC tagged building blocks 7, the NFC cards 12 and the NFC card 15 may include one or more NFC tags, such as, for example, NFC tag(s) 27. In some example embodiments the game board 11 may include one or more NFC tags (e.g., NFC tags 27). However, in other example embodiments, the game board 11 may not include any NFC tags. The NFC cards 5 may include a display 17 (e.g., display 87) and one or more inputs 19 (e.g., user-input interface 89). In one example embodiment, the NFC tag (e.g., NFC tag 27) of the NFC cards 5 may be passive and as such may not include a battery. In some other example embodiments, the NFC tag of the NFC cards 5 may be active and as such may include a battery. The battery may, but need not, facilitate broadcast or beaconing of a signal(s) from a respective NFC card 5. The sleeve 14 may be a cover for a NFC card (e.g., a NFC card 12). The NFC card 15 may be a programmable/rewritable NFC card. The NFC card 15 may, but need not, be a smartcard (e.g., a tag 31).

In the game kit 9 of FIG. 7, the NFC tagged game tokens 3, the NFC cards 5, the NFC tagged building blocks 7, the NFC cards 12, and the NFC card 15 may be game pieces (e.g., game pieces 33). The sleeve 14 and/or the game board 11 may be game accessories of the game kit (e.g., game kit 9). In an example embodiment, a generic constant identifier (ID) of each game piece may be assigned, by a processor (e.g., processor 84) of the game piece, as aggregated data field values corresponding to different properties of a corresponding physical game piece (e.g., a NFC card 12), including, but not limited to, one or more user distinguishable properties of an object of the game piece such as, for example, a color(s), a number(s), an alphabet letter(s), a shape(s), a sequence number(s), a serial number(s), a piece number(s), a code number(s) or any other suitable properties. In some example embodiments, the processor (e.g., processor 84) may receive the properties from an external device (e.g., a server) and may facilitate assigning of the received properties by enabling storage of the assigned properties in a memory (e.g., memory 82).

In the game kit 9 of FIG. 7, one or more of the game pieces may include one or more visible properties and markings, etc. In this regard, one or more combinations of some game pieces with particularly chosen markings may correspond to one or more decks (e.g., card decks) that may be designed to maximize versatility while minimizing cost.

A processor such as, for example, processor 84 may, but need not, utilize the same data assignment and an encoding mechanism to encode one or more user-distinguishable properties such as, for example, color, in order to enable one or more game pieces from different decks (e.g., including game pieces of different types (e.g., cards, building blocks)) to be used together by the same application or game.

Referring now to FIGS. 8 and 9, an example embodiment of one or more cards of a deck of cards of a game kit is provided. The visual form of each card of a deck of cards (e.g., deck of cards 18) may include multiple visual markings, each of a different type, on different parts of each card. For example, one side (e.g., side 21 of FIG. 9) of the cards may be identical across all cards (e.g., blank, or with a logo on it). This may, for example, permit use of the deck in games where players are intentionally not supposed to be able to visually distinguish the cards. The other side (e.g., side 23 of FIG. 9) of the cards may have one or more colors (e.g., a combination of colors (e.g., green, blue, orange, purple, yellow, red, etc.)), letters, numbers and other symbols, in various positions.

The background (e.g., background 27 of FIG. 9), foreground and/or a border (e.g., border 25 of FIG. 9) of different cards may be different colors (e.g., red, green, blue, yellow, etc.). The lower half of the card may include an alphabetic character(s) (e.g., "A" of FIG. 9), or other character(s) used for word formation, in non-alphabetic languages, and the upper half of the card may include a number(s) (e.g., "1" of FIG. 9). The number(s) may correspond to a first field value and the alphabet character(s) may correspond to a second field value. In an instance in which the number consists of two or more digits, the least significant digit may be depicted in a different way (e.g., in a different font, different color, different position, or other differentiating manner) from the other digits. In numeric games that may only need one digit per card, this may allow the user to utilize the last digit, and ignore the other digits.

On some cards, other symbols, including direction symbols, punctuation, mathematical operator symbols, etc., may be used in place of alphabet(s) or numeric characters.) (See e.g., FIG. 13) Optionally, the number(s) may be on the lower half of a card, while the letter(s) may be on the upper half of the card or the number(s) and letter(s) may be in any other suitable positions of the card. Additionally, optionally the halves of the cards may be written upside-down relative to each other, as shown in the set 43 of cards in FIG. 10, for example. In this manner, a player may rotate the cards around so that the kind of symbol that is relevant to the current game is right-side-up. As such, the other half of the cards may be made less distracting to players because the upside-down symbols may quickly be recognized as irrelevant to the current game. Additionally, or alternatively one or more sequence numbers (e.g., a number from 0 to 1000) or one or more part numbers (e.g., part number 31 of FIG. 9 (e.g., Part#0c6401)) may be printed on each of the cards of a deck to allow a user to quickly arrange the cards in a sequence. Additionally or alternatively, a card(s) may include one or more symbols or graphical marks (e.g., mark 29 of FIG. 9) indicating to a user a best location to tap a card(s) with the apparatus 50 (e.g., mobile terminal 10) so that the NFC module 71 may read data of the card (e.g., a NFC card 12). Additionally or alternatively, one or more cards of a deck (e.g., deck of cards 18) may have a display (e.g., display 17), an input(s) (e.g., input 19), and programmable logic (e.g., smartcard) capability.

A memory (e.g., memory 82) of each card of a deck of cards (e.g., deck of cards 18) may include data for the card. In this regard, each card of a deck of cards may have a read only unique identifier (UID). In an example embodiment, visually identical cards may have different UIDs. Additionally, the memory (e.g., memory 82) of the cards may include a constant data payload, including, but not limited to, a representation of the various attributes of the card (e.g., color, letter, number, etc.). In an example embodiment, visually identical cards may, but need not, have the same constant payload data. In some example embodiments, a memory of a card may include a rewritable data field that is writable using a device with an NFC module (e.g., NFC module 71) of an apparatus 50 (e.g., a mobile terminal 10).

In view of the foregoing description, a composition of one or more decks of cards may correspond to different combinations of cards with different markings and data contents. For instance, the example embodiment of FIG. 8 may correspond to a starter deck of N cards (e.g., N>12) including at least one card for at least the N most common letters in the alphabet (e.g., English alphabet) and at least one card for digits 0 to 9, with a different combination of colors including, but not limited to, colors such as, for example, red, yellow, green, blue, etc. The starter deck (also referred to herein as deck of cards 18) of the example embodiment of FIG. 8 may, but need not, include 36 cards. The starter deck 18 may include a card for each character in the alphabet of a language (e.g., English language).

Referring now to FIG. 11, a diagram of a mini starter deck of cards of a game kit according to an example embodiment is provided. The mini starter deck of cards 45 may be a less expensive option and may include 16 cards. The cards may provide a complete set of numbers, as well as the most frequently used letters in a language (e.g., the English language).

Referring now to FIG. 12, a diagram illustrating an expansion deck of cards according to an example embodiment is provided. The expansion deck of cards 47 (also referred to herein as expansion set 47) may add cards of different colors, different numbers, or different symbols to another deck of cards (e.g., the mini starter deck of cards 45). The symbols may include, but are not limited to, control symbols such as, for example, direction symbols and/or media control symbols, etc. The composition of the expansion set 47 may be designed such that buying different versions of the expansion set may provide new combinations of letters, colors, and numbers.

Referring now to FIG. 13, a diagram illustrating an optional set of cards and one or more stickers that may be part of a game kit is provided. The cards 49 may be NFC cards having additional symbols and controls that may optionally be utilized with a game kit (e.g., game kit 9) and one or more stickers 51 such as NFC stickers that may optionally be utilized with a game kit (e.g., game kit 9).

Each of the cards and stickers of the example embodiments of FIGS. 8-13 may include an NFC tag (e.g., NFC tag 27) which may communicate data to an apparatus 50 in response to the apparatus 50 entering a proximity of the cards or stickers. In this regard, the NFC application module 78 may input data associated with the received data of the cards/stickers into an electronic game or application, as described more fully herein. Although some of the cards/stickers of the example embodiments of FIGS. 8-13 include alphabet in the English language, it should be pointed out that the cards/stickers may include other alphabet or characters (for example, in other languages (e.g., Chinese characters)) without departing from the spirit and scope of the invention.

Referring back to FIG. 7, the physical form of the NFC tagged building blocks 7 (also referred to herein as blocks) may include an embedded NFC tag (e.g., NFC tag 27), as described above. Each block may, but need not, be a different color and shape. Each block may also contain other markings, including symbols, letters, etc. In one example embodiment, a different kind of marking may be on different faces of the blocks. For example, one side may have an alphabet letter(s), while the other may have a number(s). The blocks 7 may be designed to interlock with other blocks, whether NFC enabled or not. In addition, one or more sequence numbers (e.g., a number from 0 to 1000) or one or more part numbers may be printed on the blocks 7 to allow a user to quickly arrange the blocks 7 in a sequence. The blocks may, but need not, include a symbol(s), a graphical mark(s) or a special shape(s) indicating to a user a best location to tap a block with a NFC module (e.g., NFC module 71) of an apparatus 50 (e.g., mobile terminal 10). One or more of the blocks 7 may, but need not include a display (e.g., display 87), an input(s) (e.g., user input interface 89), and programmable logic (e.g., smartcard) capability.

The data of each of the blocks 7 may be similar to data of the cards (e.g., NFC cards 12) of a deck. The data may be stored in a memory (e.g., memory 82) of the blocks 7. Each memory of the blocks may include a read-only unique ID (UID). In an example embodiment, visually identical blocks may include different UIDs. Additionally, a memory (e.g., memory 82) of the blocks 7 may include a constant data payload, including a representation of the various attributes of the block (e.g., a color(s), a shape(s), a code number(s), an alphabet letter(s), a number(s) printed on a block (e.g., block 7), etc.) In an example embodiment, visually identical blocks may have the same constant data payload. Additionally or alternatively, one or more of the blocks 7 may have a rewritable data field that is writable using a device with an NFC module (e.g., NFC module 71) of an apparatus 50 (e.g., mobile terminal 10).

Referring now to FIG. 14, a diagram illustrating accessories for a game kit according to an example embodiment is provided. The accessories of the game kit (e.g., game kit 9) may include one or more optional sleeves 33, 35, optional stickers 37 and at least one optional game board 39 (also referred to herein as play sheet 39).

The sleeves 33, 35 may be covers for one or more game cards (e.g., NFC game card 34 (for example, NFC card 12)). The sleeves 33, 35 may include application-specific artwork and markings that may make the cards temporarily look application specific for the purpose of playing particular games. The sleeves 33, 35 may optionally have small markings indicating a type of game card that is meant to be used with the sleeves (e.g., a "knight" sleeve may indicate that a player is expected to insert an "A" card in the sleeve). Additionally, one or more of the sleeves (e.g., sleeve 35) may optionally have one or more transparent parts (e.g., transparent panel 32) that may allow some of the markings of the card that may be relevant to the game to show through (e.g., a "knight" sleeve may let the color of the card show through, if it is relevant to the game to indicate whether the knight is blue, green, or red, etc.) Moreover, the accessories of the game kit may include one or more stickers (e.g., sticker 37) that may be used to cover at least parts of a game card 36 to add application-specific artwork. The stickers may, but need not, be temporary.

The game board 39 may include application-specific artwork, and may indicate one or more spaces in which game cards may be placed. The spaces may, but need not, include a pocket, sleeve, or other structure to hold the game cards (e.g., NFC game card 38, NFC game card 40) in place. The game board 39 may also have one or more transparent parts 41 to allow a portion of a game card to show through the game board 39.

As described above, a processor (e.g., processor 84) of the game pieces (e.g., tokens 3, blocks 7, NFC cards 12, NFC cards 5, NFC card 15, etc.) may assign the generic constant ID of each game piece, as an aggregation of data field values corresponding to different properties of the corresponding physical game piece (e.g., color(s), number(s), alphabet letter(s), shape(s), sequence number(s), serial piece number(s), etc.). In this regard, the processor (e.g., processor 84) of a game piece may encode and facilitate storage (for example, in a memory (e.g., memory 82)) of the generic constant ID(s) into the payload data of a NFC tag according to different mechanisms. In this regard, a processor of the game pieces may encode each of the data field values of payload data in a data record.

The processor may implement various mechanisms for encoding data records composed of data field values. For example, the mechanisms that may be implemented/executed by the processor (e.g., processor 84) may include, but are not limited to, using fixed-length bit fields, using highly variable and expandable formats such as, for example, extensible markup language (XML) or JavaScript Object Notation (JSON), as well as any other suitable mechanisms.

In order to encode individual values, the processor of the game pieces may implement various encodings for a variety of data types such as, for example, Unicode for alphabet characters, binary for numeric values, the red-green-blue (RGB) color model, Pantone or other color coding systems, etc.

In some example embodiments, the processor of the game pieces may encode and facilitate storage of the data record(s)

into an NFC tag (e.g., NFC tag 27), according to various alternatives including, but not limited to: (1) writing the encoded data as a raw byte array into a NFC tag (e.g., irrespective of a NFC Data Exchange Format (NDEF)); (2) writing the encoded data into a NFC tag as a single NDEF record (e.g., containing the raw byte array); (3) writing a separate NDEF record (e.g., within the same tag) for each property of an object (e.g., a separate NDEF record for a color(s), a separate NDEF for a number(s), etc.), in which the NDEF record may use standard types; (4) as a Uniform Resource Locator (URL) record (e.g., an NDEF Uniform Resource Identifier (URI) type or smart-poster-type record) with the encoded data incorporated into the URL in a textual-binary form (e.g., Base64); (5) as a URL record (e.g., an NDEF URI-type or smart-poster-type record) with the data incorporated into the URL as GET-style parameters of the URL; (6) or according to any other suitable approaches.

In an example embodiment, the URL-type records may be utilized to direct a user to a web page with more information about a corresponding game piece. The additional information about the game piece may include but is not limited to data indicating where to purchase the game piece and one or more potential applications that the game piece may be used with. In some example embodiments, the processor of a game piece may include an indicator at the beginning of the payload data, indicating the encoding method(s) being used. In some alternative example embodiments, the indicator may be in any other suitable position(s) (e.g., at the end) of the payload data. By including an indicator at the beginning of payload data, the processor of a game piece may enable tags written in various encodings to be interoperable since a reader (e.g., NFC module 71) of the apparatus 50 may know how to handle and process different encodings.

The payload data include any suitable data. In some example embodiments, the payload data may include data indicating one or more colors of a game piece, (2) one or more part numbers, serial numbers, catalog numbers of a game piece and optionally an encoding that may represent a shape of a game piece. In this regard, in an instance in which a game piece may include a single color, for example, the processor (e.g., processor 84) may include at least a color field value in the payload data, in a format that is compatible with other game pieces of other forms. For example, in an instance in which a processor of a game piece may be utilizing XML to encode a data record and encoding a color using a <color> tag, then the processor may use the same tag and format regardless of whether the data record is describing a building block (e.g., building block 7) game piece or a playing card (e.g., a NFC card 12) game piece. By including the color field in the payload data the processor of a game piece may enable games that are based purely on color to be played using a combination of pieces from different sets and forms of game kits.

In an instance in which a game piece such as, for example, a building block (e.g., a building block 7) has a part number(s) or catalog number(s), the processor of the game piece (e.g., a building block 7) may include the part number(s) or catalog number(s) in a field of the payload data and may set the field to an appropriate value. In this regard, game pieces with identical physical features may, but need not, have identical payload data, including the part number, but may be distinguished from each other by evaluating a unique ID (UID) of a tag (e.g., NFC tag 27). The set value may be a number which may be utilized by one or more application programs that may convert the number(s) to specific information about the corresponding game piece (e.g., a building block 7) such as, for example, a shape, connectivity, etc., using a lookup table, for example, provided by a parts manufacturer without requiring this information to be stored in a tag (e.g., NFC tag 27) of the corresponding game piece (e.g., a building block 7).

In an example embodiment, a processor of a game piece may include an encoding that represents the shape(s) of a game piece (e.g., a building block 7) in the payload data. As an example, the shape(s) may be described numerically, via the processor, by providing a list of normalized x-y coordinates of the vertices of a game piece (e.g., a building block 7). By describing the shape(s) of a game piece in this manner, the processor of the corresponding game piece may allow one or more applications/games to determine the shape of the (e.g., a building block 7) without requiring the game piece to include the lookup table. In this regard, the processor of the game piece(s) may enable compatibility across parts generated by different manufacturers.

An example embodiment of utilizing one or more game pieces of a game kit (e.g., game kit 9) during implementation/execution of a game or interactive application will now be described. In an instance in which the apparatus 50 (e.g., a mobile terminal) may be within a proximity of a game piece (e.g., a NFC card 12, a building block 7, a game token 3, etc.), the NFC module 71 may scan a tag (e.g., a NFC tag 27) of the game piece and may read data of the tag. The data of the tag (e.g., NFC tag 27) may be stored in a memory (e.g., memory 82). The data may include payload data having one or more user distinguishable properties. The payload data may be encoded in a particular format by a processor (e.g., processor 84) of the corresponding tag, in the manner described above. The user distinguishable properties may include, but are not limited to, one or more attributes of the game piece such as, for example, a color(s), a number(s), an alphabet letter(s), a shape(s), a sequence number(s), a serial number(s), a piece number(s), a code number(s), etc. of the corresponding game piece.

In this regard, in response to reading the data of the tag of the corresponding NFC game piece, the NFC module 71 may decode and parse one or more relevant fields of the payload data (e.g., a color(s), a letter(s), etc.) and may provide this data to the NFC application module 78 so that the NFC application module 78 may utilize the data in an electronic game being executed by the NFC application module 78 and/or the processor 70. For purposes of illustration and not of limitation, in an instance in which the data read from a game piece and provided to the NFC application module 78, by the NFC module 71, corresponds to a color or a letter, the NFC application module 78 may translate the data of the color (e.g., a green color) or letter (e.g., a letter "A") to an item(s) of virtual data (e.g., a virtual object, a virtual location). In this regard, the NFC application module 78 may include the virtual data in a virtual world of the electronic game or application that may currently be displayed (e.g., via display 85). The NFC application module 78 may incorporate the item of virtual data in the virtual world during the execution of the electronic game or application. In an alternative example embodiment, the NFC application module 78 may provide data associated with the item of virtual data in the virtual world to a display (e.g., display 17) of a game piece such as, for example, an NFC card 5 during execution of the electronic game or application. In this manner, a user may interact with the virtual world shown on the display of the NFC card 5 by utilizing an input (e.g., input 19) of the NFC card 5.

Additionally, the NFC application module 78 of the apparatus 50 may prompt a user to place certain game pieces in particular physical positions according to visual markings based on for example, user distinguishable properties, read from a game piece (e.g., a NFC card 12), including but not limited to a color, letter, number, etc., or any combination thereof. In some example embodiments, the NFC application module 78 may facilitate positioning and placement of one or more game pieces by generating a visual prompt showing, via a display (e.g., display 85), a user a depiction of where each game piece of a game kit should be placed.

Alternatively, a game sheet (e.g., game sheet 11) may have markings indicating which game pieces (e.g., NFC cards 12) are to be placed in certain positions on the game sheet. For example, during game play, in an instance in which an NFC module 71 of an apparatus 50 scans a game piece(s), the NFC module 71 may read the data and may convert the read data of one or more relevant fields (for example, fields of payload data) into a corresponding position value, which may be used in the electronic game or application to indicate to a user where to place a corresponding game piece.

In an example embodiment, the NFC application module 78 may disregard some fields of payload data read from a game piece in an instance in which these fields may not be relevant to a corresponding game or application. For example, in an instance in which a user was originally prompted to lay out 20 cards in alphabetical order, the NFC application module 78 of the apparatus 50 may instruct the NFC module 71, upon scanning a corresponding game piece, to only read the letter field of the data (e.g., payload data) and the NFC module 71 may disregard the other fields (e.g., color fields, number fields, etc.) of the data. As such, for example, a NFC game card or even a building block or game token having a data field with a letter such as, for example, "B" may be placed in a second position (e.g., of a game sheet 11) regardless of the numeric value or color of that game card, building block or game token.

Referring now to FIG. 15, an example embodiment of a flowchart for using NFC to implement an electronic game or application is provided. Optionally, at operation 1500, an apparatus (e.g., a game piece (for example, an NFC card 12)) may include means, such as the processor 84 and/or the like for facilitating assignment of one or more items of data based in part on one or more properties (e.g., user distinguishable properties) of the apparatus to enable utilization of the apparatus with a plurality of different games or different applications based at least in part on non-application specific content of the data. The items of data may include, but is not limited to, content of one or more properties (e.g., physical properties) of the apparatus (e.g., a game piece) such as, for example, a color(s), a number(s), an alphabet letter(s), a shape(s), a sequence number(s), a serial number(s), a piece number(s), etc. At operation 1505, an apparatus (e.g., a game piece) may include means, such as the processor 84, the short range transceiver 81 and/or the like for enabling transmission of the items of data of the apparatus, via a near field communication, to a device (e.g., apparatus 50 (for example, a mobile terminal 10)) to enable the device to decode the data and translate at least one item of the data to at least one item of virtual data that is included in the electronic game or the application currently being displayed (e.g., via display 85). The apparatus (e.g., a game piece) may utilize the near field communication to direct the transmission of the data to the device (e.g., apparatus 50) in response to a detection of the device entering a proximity of the apparatus (e.g., a game piece).

It should be pointed out that FIGS. 6 and 15 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96, memory 82) and executed by a processor (e.g., processor 70, NFC application module 78, processor 94, processor 84). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 6 and 15 above may comprise a processor (e.g., the processor 70, NFC application module 78, processor 94, processor 84) configured to perform some or each of the operations (600-630, 1500-1505) described above. The processor may, for example, be configured to perform the operations (600-630, 1500-1505) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-630, 1500-1505) may comprise, for example, the processor 70 (e.g., as means for performing any of the operations described above), the NFC application module 78, the processor 94, the processor 84 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A game kit comprising:
    a plurality of near field communication game pieces comprising one or more items of data,
    wherein at least one of the near field communication game pieces is configured to assign one or more physical properties of the at least one game piece to respective items of data, among the items of data, to enable utilization of the game piece with a plurality of different games or different applications based on non-application specific content of the respective items of data,
    wherein the game piece is configured to enable transmission of the items of data, via a near field communication, to a device to enable the device to decode the items of data and translate at least one item of the items of data to at least one item of virtual data that is included in an electronic game or an application currently being displayed, and
    wherein the near field communication comprises directing the transmission of the items of data to the device in response to a detection of the device entering a proximity of the at least one game piece.

2. The game kit of claim 1, further comprising:
    at least one game board configured for placement of one or more of the game pieces.

3. The game kit of claim 1, wherein the game piece is configured utilization with the electronic game or the application based at least in part on the non-application specific content of the respective items of data.

4. The game kit of claim 1, wherein:
    a first subset of the game pieces comprises at least one of a deck of near field communication cards or one or more near field communication building blocks or one or more near field communication game tokens.

5. The game kit of claim 4, wherein the game piece comprises one of the near field communication cards that is configured to receive the virtual data and enable display of the virtual data of the electronic game or application via the near field communication card.

6. The game kit of claim 5, wherein the near field communication card comprises at least one input configured to enable interaction with the virtual item of data during execution of the electronic game or the application.

7. The game kit of claim 1, wherein the items of virtual data correspond to one or more properties of respective game pieces, the properties comprise at least one of a color, a number, an alphabet letter, a shape, a sequence number, a serial number or a piece number.

8. The game kit of claim 4, further comprising:
    one or more sleeves configured to cover one or more of the near field communication game cards to enable the cards to appear specific to a particular electronic game or a particular application being executed.

9. The game kit of claim 2, wherein:
    the game board comprises a plurality of spaces configured for the placement of the one or more game pieces during execution of the electronic game or the application.

10. The game kit of claim 1, wherein the game pieces comprise data identifying an encoded format arranged within the payload data comprising the items of data to enable the device to determine the encoded format in response to reading the payload data.

11. The game kit of claim 4, wherein at least two of the building blocks are configured to interlock with each other.

12. The game kit of claim 1, wherein the virtual data corresponds to a virtual object or a virtual location in a virtual world of the electronic game or the application.

13. The game kit of claim 1, wherein the device comprises a mobile terminal.

14. A method comprising:
    assigning one or more physical properties of at least one near field communication game piece to one or more items of data to enable utilization of the game piece with a plurality of different games or different applications based on non-application specific content of the items of data;
    enabling, via a processor, transmission of the one or more items of data of the game piece, via a near field communication, to a device to enable the device to decode the items of data and translate at least one item of the items of data to at least one item of virtual data that is included in an electronic game or an application currently being displayed,
    wherein the near field communication comprises directing the transmission of the items of data to the device in response to a detection of the device entering a proximity of the at least one game piece.

15. The method of claim 14, wherein the game piece is configured for placement on at least one space of a game board based in part on an item of the data.

16. The method of claim 14, wherein:
    assigning the physical properties further comprises assigning the physical properties of the game piece to the items of data to enable utilization of the game piece with the electronic game or the application based at least in part on the non-application specific content of the items of data.

17. The method of claim 14, wherein the game piece comprises at least one of a near field communication card, a near field communication building block or a near field communication game token.

18. The method of claim 14, further comprising:
    receiving the virtual data from the device and enabling display of the virtual data of the electronic game or the application via the game piece.

19. The method of claim 18, further comprising:
    enabling interaction with the virtual item of data, via the game piece, during execution of the electronic game or the application.

20. An apparatus comprising:
    at least one processor; and
    at least one memory including computer program code, the at least one memory and the computer program code configured to, with the at least one processor, cause the apparatus to perform at least the following:
        assign one or more physical properties of the apparatus to one or more items of data to enable utilization of the apparatus with a plurality of different games or different applications based on non-application specific content of the items of data;
        enable transmission of the one or more items of data of the apparatus, via a near field communication, to a device to enable the device to decode the items of data and translate at least one item of the items of data to at least one item of virtual data that is included in an electronic game or an application currently being displayed, wherein the near field communication comprises directing the transmission of the data to the device in response to a detection of the device entering a proximity of the apparatus.

21. The apparatus of claim 20, wherein the apparatus is configured for placement on at least one space of a game board based in part on an item of the data.

22. The apparatus of claim 20, wherein the at least one memory and computer program code are further configured to, with the processor, cause the apparatus to:

assign the physical properties by assigning the physical properties of the apparatus to the items of data to enable utilization of the apparatus with the electronic game or the application based at least in part on the non-application specific content of the items of data.

23. The apparatus of claim 20, wherein the apparatus comprises at least one of a near field communication card, a near field communication building block or a near field communication game token.

24. The apparatus of claim 20, wherein the at least one memory and computer program code are further configured to, with the processor, cause the apparatus to:

receive the virtual data from the device and enable display of the virtual data of the electronic game or the application via the apparatus.

25. The apparatus of claim 24, wherein the at least one memory and computer program code are further configured to, with the processor, cause the apparatus to:

enable interaction with the virtual item of data, via the apparatus, during execution of the electronic game or the application.

* * * * *

UNITED STATES PATENT AND TRADEMARK OFFICE
CERTIFICATE OF CORRECTION

| | | |
|---|---|---|
| PATENT NO. | : 8,764,571 B2 | Page 1 of 1 |
| APPLICATION NO. | : 13/211864 | |
| DATED | : July 1, 2014 | |
| INVENTOR(S) | : Sarmenta | |

It is certified that error appears in the above-identified patent and that said Letters Patent is hereby corrected as shown below:

In the Claims

<u>Column 37,</u>
Line 35, "configured utilization" should read --configured for utilization--.

Signed and Sealed this
Twenty-first Day of October, 2014

Michelle K. Lee
*Deputy Director of the United States Patent and Trademark Office*